United States Patent
Yousaf et al.

(10) Patent No.: US 10,552,994 B2
(45) Date of Patent: Feb. 4, 2020

(54) SYSTEMS AND INTERACTIVE USER INTERFACES FOR DYNAMIC RETRIEVAL, ANALYSIS, AND TRIAGE OF DATA ITEMS

(71) Applicant: Palantir Technologies Inc., Palo Alto, CA (US)

(72) Inventors: Timothy Yousaf, New York, NY (US); Drew Dennison, Palo Alto, CA (US); Paul Thoren, Arlington, VA (US); Khoa Pham, New York, NY (US); Eliot Ball, West Yorkshire (GB); Spencer Tank, Brooklyn, NY (US); John McRaven, Palo Alto, CA (US); Lucas Ray, Palo Alto, CA (US); Jeffrey Tsui, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 511 days.

(21) Appl. No.: 14/859,882

(22) Filed: Sep. 21, 2015

(65) Prior Publication Data
US 2016/0180557 A1    Jun. 23, 2016

Related U.S. Application Data

(60) Provisional application No. 62/095,662, filed on Dec. 22, 2014.

(51) Int. Cl.
*G06T 11/20* (2006.01)
*G06F 3/0481* (2013.01)
(Continued)

(52) U.S. Cl.
CPC .......... *G06T 11/206* (2013.01); *G06F 3/0481* (2013.01); *G06F 16/334* (2019.01); *G06F 16/338* (2019.01); *G06F 16/3328* (2019.01)

(58) Field of Classification Search
CPC .... G06F 3/048; G06F 16/3328; G06F 16/334; G06F 16/338; H04L 43/045; G06T 11/206
See application file for complete search history.

(56) References Cited

U.S. PATENT DOCUMENTS

| 5,109,399 A | 4/1992 | Thompson |
| 5,329,108 A | 7/1994 | Lamoure |

(Continued)

FOREIGN PATENT DOCUMENTS

| AU | 2014206155 | 12/2015 |
| AU | 2014250678 | 2/2016 |

(Continued)

OTHER PUBLICATIONS

US 8,712,906 B1, 04/2014, Sprague et al. (withdrawn)

(Continued)

*Primary Examiner* — Kieu D Vu
*Assistant Examiner* — Blaine T. Basom
(74) *Attorney, Agent, or Firm* — Knobbe, Martens, Olson & Bear, LLP

(57) ABSTRACT

Embodiments of the present disclosure relate to a data analysis system that may receive data comprising a plurality of raw data items from one or more data sources, such as a monitoring agent located in a monitored network. The received data may be scored using one or more scoring rules and/or algorithms, with raw data items satisfying a score threshold designated as "data item leads." Raw data items associated with a data item lead may be searched and displayed to the user via an interactive user interface. The data analysis system may be used to execute searches and additional enrichments against the received raw data items. The data analysis system may group received raw data items based upon shared attribute values. The data analysis system may be used to categorize received data and construct timelines, histograms, and/or other visualizations based upon the various attributes of the raw data items.

20 Claims, 18 Drawing Sheets

US 10,552,994 B2
Page 2

(51) Int. Cl.
*G06F 16/332* (2019.01)
*G06F 16/33* (2019.01)
*G06F 16/338* (2019.01)

(56) References Cited

U.S. PATENT DOCUMENTS

| | | | |
|---|---|---|---|
| 5,632,009 A | 5/1997 | Rao et al. |
| 5,670,987 A | 9/1997 | Doi et al. |
| 5,724,575 A | 3/1998 | Hoover et al. |
| 5,781,704 A | 7/1998 | Rossmo |
| 5,798,769 A | 8/1998 | Chiu et al. |
| 5,845,300 A | 12/1998 | Comer |
| 5,872,973 A | 2/1999 | Mitchell et al. |
| 5,897,636 A | 4/1999 | Kaeser |
| 6,057,757 A | 5/2000 | Arrowsmith et al. |
| 6,073,129 A | 6/2000 | Levine et al. |
| 6,091,956 A | 7/2000 | Hollenberg |
| 6,094,653 A | 7/2000 | Li et al. |
| 6,161,098 A | 12/2000 | Wallman |
| 6,167,405 A | 12/2000 | Rosensteel, Jr. et al. |
| 6,219,053 B1 | 4/2001 | Tachibana et al. |
| 6,232,971 B1 | 5/2001 | Haynes |
| 6,243,717 B1 | 6/2001 | Gordon et al. |
| 6,247,019 B1 | 6/2001 | Davies |
| 6,279,018 B1 | 8/2001 | Kudrolli et al. |
| 6,304,873 B1 | 10/2001 | Klein et al. |
| 6,341,310 B1 | 1/2002 | Leshem et al. |
| 6,366,933 B1 | 4/2002 | Ball et al. |
| 6,369,835 B1 | 4/2002 | Lin |
| 6,374,251 B1 | 4/2002 | Fayyad et al. |
| 6,418,438 B1 | 7/2002 | Campbell |
| 6,430,305 B1 | 8/2002 | Decker |
| 6,456,997 B1 | 9/2002 | Shukla |
| 6,510,504 B2 | 1/2003 | Satyanarayana |
| 6,549,752 B2 | 4/2003 | Tsukamoto |
| 6,549,944 B1 | 4/2003 | Weinberg et al. |
| 6,560,620 B1 | 5/2003 | Ching |
| 6,567,936 B1 | 5/2003 | Yang et al. |
| 6,574,635 B2 | 6/2003 | Stauber et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,674,434 B1 | 1/2004 | Chojnacki et al. |
| 6,714,936 B1 | 3/2004 | Nevin, III |
| 6,745,382 B1 | 6/2004 | Zothner |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,906,717 B2 | 6/2005 | Couckuyt et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,058,648 B1 | 6/2006 | Lightfoot et al. |
| 7,111,231 B1 | 9/2006 | Huck et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,194,680 B1 | 3/2007 | Roy et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,318,054 B2 | 1/2008 | Nomura et al. |
| 7,333,998 B2 | 2/2008 | Heckerman et al. |
| 7,370,047 B2 | 5/2008 | Gorman |
| 7,373,669 B2 | 5/2008 | Eisen |
| 7,379,811 B2 | 5/2008 | Rasmussen et al. |
| 7,379,903 B2 | 5/2008 | Caballero et al. |
| 7,392,249 B1 | 6/2008 | Harris et al. |
| 7,426,654 B2 | 9/2008 | Adams et al. |
| 7,451,397 B2 | 11/2008 | Weber et al. |
| 7,454,466 B2 | 11/2008 | Bellotti et al. |
| 7,461,158 B2 | 12/2008 | Rider et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,756,843 B1 | 7/2010 | Palmer |
| 7,761,407 B1 | 7/2010 | Stern |
| 7,770,100 B2 | 8/2010 | Chamberlain et al. |
| 7,783,658 B1 | 8/2010 | Bayliss |
| 7,805,457 B1 | 9/2010 | Viola et al. |
| 7,809,703 B2 | 10/2010 | Balabhadrapatruni et al. |
| 7,814,084 B2 | 10/2010 | Hallett et al. |
| 7,814,102 B2 | 10/2010 | Miller et al. |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,979,457 B1 | 7/2011 | Garman |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,041,714 B2 | 10/2011 | Aymeloglu et al. |
| 8,046,283 B2 | 10/2011 | Burns |
| 8,046,362 B2 | 10/2011 | Bayliss |
| 8,054,756 B2 | 11/2011 | Chand et al. |
| 8,095,582 B2 | 1/2012 | Cramer |
| 8,103,543 B1 | 1/2012 | Zwicky |
| 8,112,425 B2 | 2/2012 | Baum et al. |
| 8,126,848 B2 | 2/2012 | Wagner |
| 8,134,457 B2 | 3/2012 | Velipasalar et al. |
| 8,135,679 B2 | 3/2012 | Bayliss |
| 8,135,719 B2 | 3/2012 | Bayliss |
| 8,145,703 B2 | 3/2012 | Frishert et al. |
| 8,185,819 B2 | 5/2012 | Sah et al. |
| 8,196,184 B2 | 6/2012 | Amirov et al. |
| 8,214,361 B1 | 7/2012 | Sandler et al. |
| 8,214,490 B1 | 7/2012 | Vos et al. |
| 8,214,764 B2 | 7/2012 | Gemmell et al. |

(56) References Cited

U.S. PATENT DOCUMENTS

| | | |
|---|---|---|
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,250,474 B2 * | 8/2012 | Peters ............... G06F 17/30044 707/714 |
| 8,266,168 B2 | 9/2012 | Bayliss |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,321,943 B1 | 11/2012 | Walters et al. |
| 8,347,398 B1 | 1/2013 | Weber |
| 8,352,881 B2 | 1/2013 | Champion et al. |
| 8,368,695 B2 | 2/2013 | Howell et al. |
| 8,375,141 B2 | 2/2013 | Rowstron et al. |
| 8,392,394 B1 | 3/2013 | Kumar et al. |
| 8,397,171 B2 | 3/2013 | Klassen et al. |
| 8,412,707 B1 | 4/2013 | Mianji |
| 8,423,909 B2 | 4/2013 | Zabielski |
| 8,447,674 B2 | 5/2013 | Choudhuri et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,484,168 B2 | 7/2013 | Bayliss |
| 8,489,331 B2 | 7/2013 | Kopf et al. |
| 8,489,623 B2 | 7/2013 | Jain et al. |
| 8,489,641 B1 | 7/2013 | Seefeld et al. |
| 8,495,077 B2 | 7/2013 | Bayliss |
| 8,498,969 B2 | 7/2013 | Bayliss |
| 8,498,984 B1 | 7/2013 | Hwang et al. |
| 8,504,542 B2 | 8/2013 | Chang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,600,872 B1 | 12/2013 | Yan |
| 8,620,641 B2 | 12/2013 | Farnsworth et al. |
| 8,620,934 B2 | 12/2013 | Fong et al. |
| 8,639,757 B1 | 1/2014 | Zang et al. |
| 8,646,080 B2 | 2/2014 | Williamson et al. |
| 8,656,478 B1 * | 2/2014 | Forristal ............... H04L 63/20 726/11 |
| 8,676,857 B1 | 3/2014 | Adams et al. |
| 8,682,812 B1 | 3/2014 | Ranjan |
| 8,688,573 B1 | 4/2014 | Rukonic et al. |
| 8,689,108 B1 | 4/2014 | Duffield et al. |
| 8,700,643 B1 | 4/2014 | Gossweiler |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,786,605 B1 | 7/2014 | Curtis et al. |
| 8,787,939 B2 | 7/2014 | Papakipos et al. |
| 8,788,405 B1 | 7/2014 | Sprague et al. |
| 8,788,407 B1 | 7/2014 | Singh et al. |
| 8,799,799 B1 | 8/2014 | Cervelli et al. |
| 8,812,960 B1 | 8/2014 | Sun et al. |
| 8,818,892 B1 | 8/2014 | Sprague et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,898,184 B1 | 11/2014 | Garman |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,930,331 B2 | 1/2015 | McGrew et al. |
| 8,937,619 B2 | 1/2015 | Sharma et al. |
| 8,938,686 B1 | 1/2015 | Erenrich et al. |
| 8,949,164 B1 | 2/2015 | Mohler |
| 8,954,410 B2 | 2/2015 | Chang et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,069,842 B2 | 6/2015 | Melby |
| 9,092,482 B2 | 7/2015 | Harris et al. |
| 9,100,428 B1 | 8/2015 | Visbal |
| 9,116,975 B2 | 8/2015 | Shankar et al. |
| 9,129,219 B1 | 9/2015 | Robertson et al. |
| 9,135,233 B2 | 9/2015 | Fan et al. |
| 9,135,658 B2 | 9/2015 | Sprague et al. |
| 9,146,954 B1 | 9/2015 | Boe et al. |
| 9,165,299 B1 | 10/2015 | Stowe et al. |
| 9,171,334 B1 | 10/2015 | Visbal et al. |
| 9,177,344 B1 | 11/2015 | Singh et al. |
| 9,202,249 B1 | 12/2015 | Cohen et al. |
| 9,208,159 B2 | 12/2015 | Stowe et al. |
| 9,229,952 B1 | 1/2016 | Meacham et al. |
| 9,230,280 B1 | 1/2016 | Maag et al. |
| 9,256,664 B2 | 2/2016 | Chakerian et al. |
| 9,280,532 B2 | 3/2016 | Cicerone |
| 9,344,447 B2 | 5/2016 | Cohen et al. |
| 9,348,920 B1 | 5/2016 | Kesin |
| 9,367,872 B1 | 6/2016 | Visbal et al. |
| 9,535,974 B1 | 1/2017 | Kesin et al. |
| 9,547,693 B1 | 1/2017 | Sheasby et al. |
| 9,645,727 B2 | 5/2017 | Devarajan et al. |
| 9,817,563 B1 | 11/2017 | Stokes et al. |
| 9,898,528 B2 | 2/2018 | Kesin |
| 10,180,929 B1 | 1/2019 | Kesin et al. |
| 2001/0021936 A1 | 9/2001 | Bertram |
| 2001/0051949 A1 | 12/2001 | Carey et al. |
| 2001/0056522 A1 | 12/2001 | Satyanarayana |
| 2002/0013781 A1 | 1/2002 | Petersen et al. |
| 2002/0033848 A1 | 3/2002 | Sciammarella et al. |
| 2002/0065708 A1 | 5/2002 | Senay et al. |
| 2002/0083039 A1 | 6/2002 | Ferrari |
| 2002/0091694 A1 | 7/2002 | Hrle et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0130907 A1 | 9/2002 | Chi et al. |
| 2002/0147805 A1 | 10/2002 | Leshem et al. |
| 2002/0169759 A1 | 11/2002 | Kraft et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0033228 A1 | 2/2003 | Bosworth-Davies et al. |
| 2003/0036848 A1 | 2/2003 | Sheha et al. |
| 2003/0039948 A1 | 2/2003 | Donahue |
| 2003/0074368 A1 | 4/2003 | Schuetze et al. |
| 2003/0097330 A1 | 5/2003 | Hillmer et al. |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0126102 A1 | 7/2003 | Borthwick |
| 2003/0130993 A1 | 7/2003 | Mendelevitch et al. |
| 2003/0140106 A1 | 7/2003 | Raguseo |
| 2003/0144868 A1 | 7/2003 | MacIntyre et al. |
| 2003/0154044 A1 | 8/2003 | Lundstedt et al. |
| 2003/0163352 A1 | 8/2003 | Surpin et al. |

(56) References Cited

U.S. PATENT DOCUMENTS

| | | |
|---|---|---|
| 2003/0172014 A1 | 9/2003 | Quackenbush et al. |
| 2003/0200217 A1 | 10/2003 | Ackerman |
| 2003/0212718 A1 | 11/2003 | Tester |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0111480 A1 | 6/2004 | Yue |
| 2004/0117345 A1 | 6/2004 | Bamford et al. |
| 2004/0117387 A1 | 6/2004 | Civetta et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0148301 A1 | 7/2004 | McKay et al. |
| 2004/0153418 A1 | 8/2004 | Hanweck |
| 2004/0160309 A1 | 8/2004 | Stilp |
| 2004/0163039 A1 | 8/2004 | Gorman |
| 2004/0181554 A1 | 9/2004 | Heckerman et al. |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0078858 A1 | 4/2005 | Yao et al. |
| 2005/0080769 A1 * | 4/2005 | Gemmell ......... G06F 17/30991 |
| 2005/0086207 A1 | 4/2005 | Heuer et al. |
| 2005/0097441 A1 | 5/2005 | Herbach et al. |
| 2005/0108063 A1 | 5/2005 | Madill et al. |
| 2005/0108231 A1 | 5/2005 | Findleton et al. |
| 2005/0114763 A1 | 5/2005 | Nonomura et al. |
| 2005/0125715 A1 | 6/2005 | Di Franco et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0222928 A1 | 10/2005 | Steier et al. |
| 2005/0246327 A1 | 11/2005 | Yeung et al. |
| 2005/0251786 A1 | 11/2005 | Citron et al. |
| 2005/0289524 A1 | 12/2005 | McGinnes |
| 2006/0026120 A1 | 2/2006 | Carolan et al. |
| 2006/0026170 A1 | 2/2006 | Kreitler et al. |
| 2006/0045470 A1 | 3/2006 | Poslinski et al. |
| 2006/0059139 A1 | 3/2006 | Robinson |
| 2006/0074866 A1 | 4/2006 | Chamberlain et al. |
| 2006/0074881 A1 | 4/2006 | Vembu et al. |
| 2006/0080316 A1 | 4/2006 | Gilmore et al. |
| 2006/0080616 A1 | 4/2006 | Vogel et al. |
| 2006/0080619 A1 | 4/2006 | Carlson et al. |
| 2006/0093222 A1 | 5/2006 | Saffer et al. |
| 2006/0095521 A1 | 5/2006 | Patinkin |
| 2006/0106847 A1 | 5/2006 | Eckardt et al. |
| 2006/0116991 A1 | 6/2006 | Calderwood |
| 2006/0129746 A1 | 6/2006 | Porter |
| 2006/0136402 A1 | 6/2006 | Lee et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0161558 A1 | 7/2006 | Tamma et al. |
| 2006/0184889 A1 | 8/2006 | Molander |
| 2006/0203337 A1 | 9/2006 | White |
| 2006/0209085 A1 | 9/2006 | Wong et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0050429 A1 | 3/2007 | Goldring et al. |
| 2007/0057966 A1 | 3/2007 | Ohno et al. |
| 2007/0061487 A1 | 3/2007 | Moore et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0106582 A1 | 5/2007 | Baker et al. |
| 2007/0130206 A1 | 6/2007 | Zhou et al. |
| 2007/0143253 A1 | 6/2007 | Kostamaa et al. |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0174760 A1 | 7/2007 | Chamberlain et al. |
| 2007/0185850 A1 | 8/2007 | Walters et al. |
| 2007/0185867 A1 | 8/2007 | Maga |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0233756 A1 | 10/2007 | D'Souza et al. |
| 2007/0240062 A1 | 10/2007 | Christena et al. |
| 2007/0266336 A1 | 11/2007 | Nojima et al. |
| 2007/0271317 A1 | 11/2007 | Carmel |
| 2007/0284433 A1 | 12/2007 | Domenica et al. |
| 2007/0294200 A1 | 12/2007 | Au |
| 2007/0294643 A1 | 12/2007 | Kyle |
| 2008/0015970 A1 | 1/2008 | Brookfield et al. |
| 2008/0016216 A1 | 1/2008 | Worley et al. |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0071731 A1 | 3/2008 | Ma et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0104019 A1 | 5/2008 | Nath |
| 2008/0104060 A1 | 5/2008 | Abhyankar et al. |
| 2008/0104149 A1 | 5/2008 | Vishniac et al. |
| 2008/0126951 A1 | 5/2008 | Sood et al. |
| 2008/0133567 A1 | 6/2008 | Ames et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0189408 A1 * | 8/2008 | Cancel ................. G06Q 10/04 709/224 |
| 2008/0195417 A1 | 8/2008 | Surpin et al. |
| 2008/0195608 A1 | 8/2008 | Clover |
| 2008/0195672 A1 | 8/2008 | Hamel et al. |
| 2008/0201339 A1 | 8/2008 | McGrew |
| 2008/0215546 A1 | 9/2008 | Baum et al. |
| 2008/0222295 A1 | 9/2008 | Robinson et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270316 A1 | 10/2008 | Guidotti et al. |

(56) References Cited

U.S. PATENT DOCUMENTS

| | | |
|---|---|---|
| 2008/0270391 A1* | 10/2008 | Newbold .......... G06F 17/30867 |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288425 A1 | 11/2008 | Posse et al. |
| 2008/0301378 A1 | 12/2008 | Carrie |
| 2008/0301643 A1 | 12/2008 | Appleton et al. |
| 2008/0313132 A1 | 12/2008 | Hao et al. |
| 2008/0319991 A1 | 12/2008 | Ross |
| 2009/0002492 A1 | 1/2009 | Velipasalar et al. |
| 2009/0018940 A1 | 1/2009 | Wang et al. |
| 2009/0024505 A1 | 1/2009 | Patel et al. |
| 2009/0024589 A1 | 1/2009 | Sood et al. |
| 2009/0027418 A1 | 1/2009 | Maru et al. |
| 2009/0030915 A1 | 1/2009 | Winter et al. |
| 2009/0031247 A1 | 1/2009 | Walter et al. |
| 2009/0037417 A1 | 2/2009 | Shankar et al. |
| 2009/0044279 A1 | 2/2009 | Crawford et al. |
| 2009/0055251 A1 | 2/2009 | Shah et al. |
| 2009/0070200 A1* | 3/2009 | August .................. G06Q 30/02 705/7.32 |
| 2009/0076845 A1 | 3/2009 | Bellin et al. |
| 2009/0082997 A1 | 3/2009 | Tokman et al. |
| 2009/0083184 A1 | 3/2009 | Eisen |
| 2009/0088964 A1 | 4/2009 | Schaaf et al. |
| 2009/0106178 A1 | 4/2009 | Chu |
| 2009/0106308 A1 | 4/2009 | Killian et al. |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150854 A1 | 6/2009 | Elaasar et al. |
| 2009/0164387 A1 | 6/2009 | Armstrong et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172669 A1 | 7/2009 | Bobak et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0192957 A1 | 7/2009 | Subramanian et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0240664 A1 | 9/2009 | Dinker et al. |
| 2009/0249244 A1 | 10/2009 | Robinson et al. |
| 2009/0254970 A1 | 10/2009 | Agarwal et al. |
| 2009/0254971 A1 | 10/2009 | Herz |
| 2009/0271343 A1 | 10/2009 | Vaiciulis et al. |
| 2009/0271359 A1 | 10/2009 | Bayliss |
| 2009/0271435 A1 | 10/2009 | Yako et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0300589 A1 | 12/2009 | Watters et al. |
| 2009/0307049 A1 | 12/2009 | Elliott et al. |
| 2009/0313223 A1 | 12/2009 | Rantanen |
| 2009/0313311 A1 | 12/2009 | Hoffmann et al. |
| 2009/0313463 A1 | 12/2009 | Pang et al. |
| 2009/0318775 A1 | 12/2009 | Michelson et al. |
| 2009/0319418 A1 | 12/2009 | Herz |
| 2009/0319891 A1 | 12/2009 | MacKinlay |
| 2009/0327208 A1 | 12/2009 | Bittner et al. |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0036831 A1 | 2/2010 | Vemuri et al. |
| 2010/0042922 A1 | 2/2010 | Bradeteanu et al. |
| 2010/0057622 A1 | 3/2010 | Faith et al. |
| 2010/0057716 A1 | 3/2010 | Stefik et al. |
| 2010/0070489 A1 | 3/2010 | Aymeloglu et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076939 A1 | 3/2010 | Iwaki et al. |
| 2010/0077481 A1 | 3/2010 | Polyakov et al. |
| 2010/0077483 A1 | 3/2010 | Stolfo et al. |
| 2010/0082541 A1 | 4/2010 | Kottomtharayil |
| 2010/0088158 A1* | 4/2010 | Pollack .................. G06Q 30/02 705/7.35 |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106611 A1 | 4/2010 | Paulsen et al. |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0122152 A1 | 5/2010 | Chamberlain et al. |
| 2010/0125546 A1 | 5/2010 | Barrett et al. |
| 2010/0131457 A1 | 5/2010 | Heimendinger |
| 2010/0131502 A1 | 5/2010 | Fordham |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0161735 A1 | 6/2010 | Sharma |
| 2010/0162176 A1 | 6/2010 | Dunton |
| 2010/0169237 A1 | 7/2010 | Howard et al. |
| 2010/0185691 A1 | 7/2010 | Irmak et al. |
| 2010/0191563 A1 | 7/2010 | Schlaifer et al. |
| 2010/0191884 A1 | 7/2010 | Holenstein et al. |
| 2010/0198684 A1 | 8/2010 | Eraker et al. |
| 2010/0199225 A1 | 8/2010 | Coleman et al. |
| 2010/0211550 A1 | 8/2010 | Daniello et al. |
| 2010/0211618 A1 | 8/2010 | Anderson et al. |
| 2010/0228812 A1 | 9/2010 | Uomini |
| 2010/0235606 A1 | 9/2010 | Oreland et al. |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0283787 A1 | 11/2010 | Hamedi et al. |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0318838 A1 | 12/2010 | Katano et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0029498 A1 | 2/2011 | Ferguson et al. |
| 2011/0029526 A1 | 2/2011 | Knight et al. |
| 2011/0047159 A1 | 2/2011 | Baid et al. |
| 2011/0047540 A1 | 2/2011 | Williams et al. |
| 2011/0055140 A1 | 3/2011 | Roychowdhury |
| 2011/0060753 A1 | 3/2011 | Shaked |
| 2011/0061013 A1 | 3/2011 | Billicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0131122 A1 | 6/2011 | Griffin et al. |
| 2011/0131547 A1 | 6/2011 | Elaasar |
| 2011/0137766 A1 | 6/2011 | Rasmussen et al. |
| 2011/0153384 A1 | 6/2011 | Horne et al. |

(56) References Cited

U.S. PATENT DOCUMENTS

| | | |
|---|---|---|
| 2011/0153592 A1 | 6/2011 | DeMarcken |
| 2011/0161096 A1 | 6/2011 | Buehler et al. |
| 2011/0161132 A1 | 6/2011 | Goel et al. |
| 2011/0161137 A1 | 6/2011 | Ubalde et al. |
| 2011/0167054 A1 | 7/2011 | Bailey et al. |
| 2011/0167105 A1 | 7/2011 | Ramakrishnan et al. |
| 2011/0167493 A1 | 7/2011 | Song et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0173619 A1 | 7/2011 | Fish |
| 2011/0178842 A1 | 7/2011 | Rane et al. |
| 2011/0181598 A1 | 7/2011 | O'Neall et al. |
| 2011/0184813 A1 | 7/2011 | Barne et al. |
| 2011/0185316 A1 | 7/2011 | Reid et al. |
| 2011/0196737 A1 | 8/2011 | Vadlamani et al. |
| 2011/0202500 A1* | 8/2011 | Warn ............... G06F 21/55 707/607 |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0218955 A1 | 9/2011 | Tang |
| 2011/0219321 A1 | 9/2011 | Gonzalez et al. |
| 2011/0219450 A1 | 9/2011 | McDougal et al. |
| 2011/0225198 A1 | 9/2011 | Edwards et al. |
| 2011/0225650 A1 | 9/2011 | Margolies et al. |
| 2011/0231223 A1 | 9/2011 | Winters |
| 2011/0238495 A1 | 9/2011 | Kang |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0246229 A1 | 10/2011 | Pacha |
| 2011/0251951 A1 | 10/2011 | Kolkowtiz |
| 2011/0258158 A1 | 10/2011 | Resende et al. |
| 2011/0258190 A1 | 10/2011 | Chen et al. |
| 2011/0258242 A1 | 10/2011 | Eidson et al. |
| 2011/0270604 A1 | 11/2011 | Qi et al. |
| 2011/0270705 A1 | 11/2011 | Parker |
| 2011/0270812 A1 | 11/2011 | Ruby |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2011/0314546 A1 | 12/2011 | Aziz et al. |
| 2012/0004904 A1 | 1/2012 | Shin et al. |
| 2012/0005581 A1 | 1/2012 | Turner et al. |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0075324 A1 | 3/2012 | Cardno et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084135 A1 | 4/2012 | Nissan et al. |
| 2012/0084287 A1 | 4/2012 | Lakshminarayan et al. |
| 2012/0084866 A1 | 4/2012 | Stolfo |
| 2012/0106801 A1 | 5/2012 | Jackson |
| 2012/0116828 A1 | 5/2012 | Shannon |
| 2012/0117082 A1 | 5/2012 | Koperda et al. |
| 2012/0123989 A1 | 5/2012 | Yu et al. |
| 2012/0124179 A1 | 5/2012 | Cappio et al. |
| 2012/0131107 A1 | 5/2012 | Yost |
| 2012/0131512 A1 | 5/2012 | Takeuchi et al. |
| 2012/0136804 A1 | 5/2012 | Lucia |
| 2012/0137235 A1 | 5/2012 | TS et al. |
| 2012/0144335 A1 | 6/2012 | Abeln et al. |
| 2012/0150791 A1 | 6/2012 | Willson |
| 2012/0158626 A1 | 6/2012 | Zhu et al. |
| 2012/0159307 A1 | 6/2012 | Chung et al. |
| 2012/0159312 A1 | 6/2012 | Mital et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203584 A1 | 8/2012 | Mishor et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0215898 A1 | 8/2012 | Shah et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0233145 A1 | 9/2012 | Howes et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0278273 A1 | 11/2012 | Fang |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330908 A1 | 12/2012 | Stowe et al. |
| 2012/0330973 A1 | 12/2012 | Ghuneim et al. |
| 2013/0006426 A1 | 1/2013 | Healey et al. |
| 2013/0006655 A1 | 1/2013 | Van Arkel et al. |
| 2013/0006668 A1 | 1/2013 | Van Arkel et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0024307 A1 | 1/2013 | Fuerstenberg et al. |
| 2013/0024339 A1 | 1/2013 | Choudhuri et al. |
| 2013/0036346 A1 | 2/2013 | Cicerone |
| 2013/0046635 A1 | 2/2013 | Grigg et al. |
| 2013/0046783 A1 | 2/2013 | Zhang et al. |
| 2013/0046842 A1 | 2/2013 | Muntz et al. |
| 2013/0050217 A1 | 2/2013 | Armitage |
| 2013/0054306 A1 | 2/2013 | Bhalla |
| 2013/0055145 A1 | 2/2013 | Antony et al. |
| 2013/0057551 A1 | 3/2013 | Ebert et al. |
| 2013/0060742 A1 | 3/2013 | Chang et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0097130 A1 | 4/2013 | Bingol et al. |
| 2013/0097482 A1 | 4/2013 | Marantz et al. |
| 2013/0101159 A1 | 4/2013 | Chao et al. |
| 2013/0110746 A1 | 5/2013 | Ahn |
| 2013/0110822 A1 | 5/2013 | Ikeda et al. |
| 2013/0110877 A1 | 5/2013 | Bonham et al. |

(56) References Cited

U.S. PATENT DOCUMENTS

| | | |
|---|---|---|
| 2013/0111320 A1 | 5/2013 | Campbell et al. |
| 2013/0117011 A1 | 5/2013 | Ahmed et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0159340 A1 | 6/2013 | Blanco et al. |
| 2013/0160120 A1 | 6/2013 | Malaviya et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0185320 A1 | 7/2013 | Iwasaki et al. |
| 2013/0197925 A1 | 8/2013 | Blue |
| 2013/0211985 A1 | 8/2013 | Clark et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0208565 A1 | 10/2013 | Castellanos et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0276799 A1 | 10/2013 | Davidson |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2013/0318060 A1 | 11/2013 | Chang et al. |
| 2013/0318594 A1 | 11/2013 | Hoy et al. |
| 2013/0318604 A1 | 11/2013 | Coates et al. |
| 2013/0332862 A1* | 12/2013 | Mirra ............... G06Q 40/06 715/760 |
| 2013/0339218 A1 | 12/2013 | Subramanian et al. |
| 2013/0339514 A1 | 12/2013 | Crank et al. |
| 2014/0006109 A1 | 1/2014 | Callioni et al. |
| 2014/0012796 A1 | 1/2014 | Petersen et al. |
| 2014/0019119 A1 | 1/2014 | Liu et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058763 A1 | 2/2014 | Zizzamia et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0081652 A1 | 3/2014 | Klindworth |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149130 A1 | 5/2014 | Getchius |
| 2014/0149272 A1 | 5/2014 | Hirani et al. |
| 2014/0149436 A1 | 5/2014 | Bahrami et al. |
| 2014/0156484 A1 | 6/2014 | Chan et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0181833 A1 | 6/2014 | Bird et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0195887 A1 | 7/2014 | Ellis et al. |
| 2014/0195916 A1* | 7/2014 | Kwon ................ G11B 27/034 715/722 |
| 2014/0214579 A1 | 7/2014 | Shen et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0280293 A1 | 9/2014 | Scanlon |
| 2014/0283067 A1 | 9/2014 | Call et al. |
| 2014/0310266 A1 | 10/2014 | Greenfield |
| 2014/0310282 A1 | 10/2014 | Sprague et al. |
| 2014/0316911 A1 | 10/2014 | Gross |
| 2014/0317104 A1* | 10/2014 | Isaacs ............... G06F 17/30554 707/728 |
| 2014/0324876 A1 | 10/2014 | Konik et al. |
| 2014/0330845 A1 | 11/2014 | Feldschuh |
| 2014/0331119 A1 | 11/2014 | Dixon et al. |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0344231 A1 | 11/2014 | Stowe et al. |
| 2014/0344256 A1 | 11/2014 | Bitincka et al. |
| 2014/0351070 A1 | 11/2014 | Christner et al. |
| 2014/0358829 A1 | 12/2014 | Hurwitz |
| 2014/0366132 A1 | 12/2014 | Stiansen et al. |
| 2014/0379755 A1 | 12/2014 | Kuriakose et al. |
| 2014/0379812 A1 | 12/2014 | Bastide et al. |
| 2015/0019394 A1 | 1/2015 | Unser et al. |
| 2015/0039886 A1 | 2/2015 | Kahol et al. |
| 2015/0046870 A1 | 2/2015 | Goldenberg et al. |
| 2015/0067533 A1 | 3/2015 | Volach |
| 2015/0073929 A1 | 3/2015 | Psota et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106347 A1 | 4/2015 | McGrew et al. |
| 2015/0106379 A1 | 4/2015 | Elliot et al. |
| 2015/0112956 A1 | 4/2015 | Chang et al. |
| 2015/0112998 A1 | 4/2015 | Shankar et al. |
| 2015/0134666 A1 | 5/2015 | Gattiker et al. |
| 2015/0135113 A1 | 5/2015 | Sekharan |
| 2015/0135256 A1 | 5/2015 | Hoy et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0188872 A1 | 7/2015 | White |
| 2015/0199324 A1* | 7/2015 | Nishioka ............ G06F 17/245 715/212 |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0235334 A1 | 8/2015 | Wang et al. |
| 2015/0242397 A1 | 8/2015 | Zhuang |
| 2015/0261817 A1 | 9/2015 | Harris et al. |
| 2015/0309719 A1 | 10/2015 | Ma et al. |

(56) References Cited

U.S. PATENT DOCUMENTS

| | | |
|---|---|---|
| 2015/0317342 A1 | 11/2015 | Grossman et al. |
| 2015/0324868 A1 | 11/2015 | Kaftan et al. |
| 2015/0338233 A1 | 11/2015 | Cervelli et al. |
| 2015/0341467 A1 | 11/2015 | Lim et al. |
| 2015/0347903 A1 | 12/2015 | Saxena et al. |
| 2015/0378996 A1 | 12/2015 | Kesin et al. |
| 2015/0379413 A1 | 12/2015 | Robertson et al. |
| 2016/0004667 A1 | 1/2016 | Chakerian et al. |
| 2016/0004764 A1 | 1/2016 | Chakerian et al. |
| 2016/0034470 A1 | 2/2016 | Sprague et al. |
| 2016/0034545 A1 | 2/2016 | Shankar et al. |
| 2016/0034555 A1 | 2/2016 | Rahut et al. |
| 2016/0048937 A1 | 2/2016 | Mathura et al. |
| 2016/0062555 A1 | 3/2016 | Ward et al. |
| 2016/0098173 A1 | 4/2016 | Slawinski et al. |
| 2016/0098485 A1* | 4/2016 | Burke ................. G06F 3/0482 707/706 |
| 2016/0147730 A1 | 5/2016 | Cicerone |
| 2016/0147769 A1 | 5/2016 | Murphey et al. |
| 2016/0180451 A1 | 6/2016 | Visbal et al. |
| 2016/0210195 A1 | 7/2016 | Sinha |
| 2016/0306965 A1 | 10/2016 | Iyer et al. |
| 2017/0046349 A1 | 2/2017 | Shankar et al. |
| 2018/0052597 A1 | 2/2018 | Stokes et al. |
| 2018/0173792 A1 | 6/2018 | Kesin |
| 2019/0114309 A1 | 4/2019 | Kesin et al. |

FOREIGN PATENT DOCUMENTS

| | | |
|---|---|---|
| CN | 102546446 | 7/2012 |
| CN | 103167093 | 6/2013 |
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014215621 | 2/2015 |
| EP | 0652513 | 5/1995 |
| EP | 1191463 | 3/2002 |
| EP | 1672527 | 6/2006 |
| EP | 2487610 | 8/2012 |
| EP | 2551799 | 1/2013 |
| EP | 2555126 | 2/2013 |
| EP | 2555153 | 2/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2911078 | 8/2015 |
| EP | 2911100 | 8/2015 |
| EP | 2940603 | 11/2015 |
| EP | 2940609 | 11/2015 |
| EP | 2963577 | 1/2016 |
| EP | 2963595 | 1/2016 |
| EP | 2985729 | 2/2016 |
| EP | 3018879 | 5/2016 |
| EP | 3037991 | 6/2016 |
| EP | 3037992 | 6/2016 |
| EP | 3038002 | 6/2016 |
| EP | 3038046 | 6/2016 |
| GB | 2513247 | 10/2014 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 2000/009529 | 2/2000 |
| WO | WO 2002/065353 | 8/2002 |
| WO | WO 2005/104736 | 11/2005 |
| WO | WO 2005/116851 | 12/2005 |
| WO | WO 2008/011728 | 1/2008 |
| WO | WO 2008/064207 | 5/2008 |
| WO | WO 2008/113059 | 9/2008 |
| WO | WO 2009/061501 | 5/2009 |
| WO | WO 2010/000014 | 1/2010 |
| WO | WO 2010/030913 | 3/2010 |
| WO | WO 2010/098958 | 9/2010 |
| WO | WO 2012/025915 | 3/2012 |
| WO | WO 2013/010157 | 1/2013 |
| WO | WO 2013/102892 | 7/2013 |
| WO | WO 2013/126281 | 8/2013 |

OTHER PUBLICATIONS

US 8,725,631 B1, 05/2014, Sprague et al. (withdrawn)
"A First Look: Predicting Market Demand for Food Retail using a Huff Analysis," TRF Policy Solutions, Jul. 2012, pp. 30.
"A Quick Guide to UniProtKB Swiss-Prot & TrEMBL," Sep. 2011, pp. 2.
"A Word About Banks and the Laundering of Drug Money," Aug. 18, 2012, http://www.golemxiv.co.uk/2012/08/a-word-about-banks-and-the-laundering-of-drug-money/.
About 80 Minutes, "Palantir in a number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.
Acklen, Laura, "Absolute Beginner's Guide to Microsoft Word 2003," Dec. 24, 2003, pp. 15-18, 34-41, 308-316.
Alfred, Rayner "Summarizing Relational Data Using Semi-Supervised Genetic Algorithm-Based Clustering Techniques", Journal of Computer Science, 2010, vol. 6, No. 7, pp. 775-784.
Alur et al., "Chapter 2: IBM InfoSphere DataStage Stages," IBM InfoSphere DataStage Data Flow and Job Design, Jul. 1, 2008, pp. 35-137.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Anjewierden et al., "Automatic Indexing of PDF Documents with Ontologies", Social Science Informatics, University of Amsterdam, The Netherlands, Jun. 11, 2011, pp. 8.
Anonymous, "BackTult—JD Edwards One World Version Control System," printed Jul. 23, 2007 in 1 page.
Antoshenkov, Gennady, "Dictionary-Based Order-Preserving String Compression", The VLDB Journal, pp. 26-39, 1997.
"Apache HBase," http://hbase.apache.org/ printed Sep. 14, 2011 in 1 page.
"The Apache Cassandra Project," http://cassandra.apache.org/ Printed Sep. 14, 2011 in 3 pages.
Baker et al., "Megastore: Providing Scalable, Highly Available Storage for Interactive Services", 5th Biennial Conference on Innovative Data Systems Research (CIDR '11), Asilomar, California, Jan. 9-12, 2011.
Baker et al., "The Development of a Common Enumeration of Vulnerabilities and Exposures," Presented at the Second International Workshop on Recent Advances in Intrusion Detection, Sep. 7-9, 1999, pp. 35.
Bernstein et al., "Hyder—A Transactional Record Manager for Shared Flash", 5th Biennial Conference on Innovative Data Systems Research (CIDR '11), vol. 12, Asilomar, California, Jan. 9-12, 2011.
Bhosale, Safal V., "Holy Grail of Outlier Detection Technique: A Macro Level Take on the State of the Art," International Journal of Computer Science & Information Technology, Aug. 1, 2014, retrieved from http://www.ijcsit.com/docs/Volume5/vol5issue04/ijcsit20140504226.pdf retrieved May 3, 2016.

(56) References Cited

OTHER PUBLICATIONS

Bluttman et al., "Excel Formulas and Functions for Dummies," 2005, Wiley Publishing, Inc., pp. 280, 284-286.
Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Chang et al., "A new multi-search engine for querying data through an Internet search service on CORBA", Computer Networks, vol. 34, Issue 3, Sep. 2000, pp. 467-480.
Chang et al., "Bigtable: A Distributed Storage System for Structured Data", Google, Inc., OSDI'06: Seventh Symposium on Operating System Design and Implementation, Seattle, WA, Nov. 2006.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Conner, Nancy, "Google Apps: The Missing Manual," May 1, 2008, pp. 15.
Definition "Identify", downloaded Jan. 22, 2015, 1 page.
Definition "Overlay", downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Devanbu et al., "Authentic Third-party Data Publication", http://www.cs.ucdavis.edu/~devanbu/authdbpub.pdf, p. 19, 2000.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Dreyer et al., "An Object-Oriented Data Model for a Time Series Management System," Proceedings of the 7th International Working Conference on Scientific and Statistical Database Management, Charlottesville, Virginia USA, Sep. 28-30, 1994, pp. 12.
Elmasri et al., "Fundamentals of Database Systems", Fourth Edition, pp. 455-491, 2004.
"The FASTA Program Package," fasta-36.3.4, Mar. 25, 2011, pp. 29.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Golmohammadi et al., "Data Mining Applications for Fraud Detection in Securities Market," Intelligence and Security Informatics Conference (EISIC), 2012 European, IEEE, Aug. 22, 2012, pp. 107-114.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Gu et al., "BotMiner: Clustering Analysis of Network Traffice for Protocol-and-Structure-Independent Botnet Detection," USENIX Security Symposium, 2008, 17 pages.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hodge et al., "A Survey of Outlier Detection Methodologies," Artificial Intelligence Review, vol. 22, No. 2, Oct. 1, 2004.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Jelen, Bill, "Excel 2013 in Depth, Video Enhanced Edition," Jan. 25, 2013.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Kitts, Paul, "Chapter 14: Genome Assembly and Annotation Process," The NCBI Handbook, Oct. 2002, pp. 1-21.
Klemmer et al., "Where Do Web Sites Come From? Capturing and Interacting with Design History," Association for Computing Machinery, CHI 2002, Apr. 20-25, 2002, Minneapolis, MN, pp. 8.
Kokossi et al., "D7-Dynamic Ontoloty Management System (Design)," Information Societies Technology Programme, Jan. 10, 2002, pp. 1-27.
Li et al., "Interactive Multimodal Visual Search on Mobile Device," IEEE Transactions on Multimedia, vol. 15, No. 3, Apr. 1, 2013, pp. 594-607.
Li et al., "Identifying the Signs of Fraudulent Accounts using Data Mining Techniques," Computers in Human Behavior, vol. 28, No. 3, Jan. 16, 2012.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manske, "File Saving Dialogs," <http://www.mozilla.org/editor/ui_specs/FileSaveDialogs.html>, Jan. 20, 1999, pp. 7.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Miklau et al., "Securing History: Privacy and Accountability in Database Systems," 3rd Biennial Conference on Innovative Data Systems Research (CIDR), Jan. 7-10, 2007, Asilomar, California, pp. 387-396.
Mizrachi, Ilene, "Chapter 1: GenBank: The Nuckeotide Sequence Database," The NCBI Handbook, Oct. 2002, pp. 1-14.

(56) References Cited

OTHER PUBLICATIONS

"Money Laundering Risks and E-Gaming: A European Overview and Assessment," 2009, http://www.cf.ac.uk/socsi/resources/Levi_Final_Money_Laundering_Risks_egaming.pdf.

Ngai et al., "The Application of Data Mining Techniques in Financial Fraud Detection: A Classification Frameworok and an Academic Review of Literature," Decision Support Systems, Elsevier Science Publishers, Amsterdam, Netherlands, vol. 50, No. 3, Feb. 1, 2011.

Niepert et al., "A Dynamic Ontology for a Dynamic Reference Work", Joint Conference on Digital Libraries, Jun. 17-22, 2007, Vancouver, British Columbia, Canada, pp. 1-10.

Nierman, "Evaluating Structural Similarity in XML Documents", 6 pages, 2002.

Nolan et al., "MCARTA: A Malicious Code Automated Run-Time Analysis Framework," Homeland Security (HST) 2012 IEEE Conference on Technologies for, Nov. 13, 2012, pp. 13-17.

Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.

Palantir Technologies, "Palantir Labs—Timeline," Oct. 1, 2010, retrieved from the internet https://www.youtube.com/watch?v=JCgDW5bru9M retrieved on Aug. 19, 2015.

Palmas et al., "An Edge-Bunding Layout for Interactive Parallel Coordinates" 2014 IEEE Pacific Visualization Symposium, pp. 57-64.

Peng et al., "Large-scale Incremental Processing Using Distributed Transactions and Notifications", Proceedings of the 9th USENIX Symposium on Operating Systems Design and Implementation, USENIX, p. 14, 2010.

Perdisci et al., "Behavioral Clustering of HTTP-Based Malware and Signature Generation Using Malicious Network Traces," USENIX, Mar. 18, 2010, pp. 1-14.

"Potential Money Laundering Warning Signs," snapshot taken 2003, https://web.archive.org/web/v20030816090055/http:/finsolinc.com/ANTI-MONEY%20LAUNDERING%20TRAINING%20GUIDES.pdf.

Quartert FS "Managing Business Performance and Detecting Outliers in Financial Services," Oct. 16, 2014, retrieved from https://quartetfs.com/images/pdf/white-papers/Quartet_FS_White_Paper_-_ActivePivot_Sentinel.pdf retrieved on May 3, 2016.

Quartert FS "Resource Center," Oct. 16, 2014, retrieved from https://web.archive.org/web/20141016044306/http://quartetfs.com/resource-center/white-papers retrieved May 3, 2016.

Quest, "Toad for Oracle 11.6—Guide to Using Toad," Sep. 24, 2012, pp. 1-162.

Rouse, Margaret, "OLAP Cube," <http://searchdatamanagement.techtarget.com/definition/OLAP-cube>, Apr. 28, 2012, pp. 16.

Shah, Chintan, "Periodic Connections to Control Server Offer New Way to Detect Botnets," Oct. 24, 2013 in 6 pages, <http://www.blogs.mcafee.com/mcafee-labs/periodic-links-to-control-server-offer-new-way-to-detect-botnets>.

Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.

Sirotkin et al., "Chapter 13: The Processing of Biological Sequence Data at NCBI," The NCBI Handbook, Oct. 2002, pp. 1-11.

Symantec Corporation, "E-Security Begins with Sound Security Policies," Announcement Symantec, Jun. 14, 2001.

Thompson, Mick, "Getting Started with GEO," Getting Started with GEO, Jul. 26, 2011.

Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.

Umagandhi et al., "Search Query Recommendations Using Hybrid User Profile with Query Logs," International Journal of Computer Applications, vol. 80, No. 10, Oct. 1, 2013, pp. 7-18.

"Using Whois Based Geolocation and Google Maps API for Support Cybercrime Investigations," http://wseas.us/e-library/conferences/2013/Dubrovnik/TELECIRC/TELECIRC-32.pdf.

Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.

Wikipedia, "Federated Database System," Sep. 7, 2013, retrieved from the internet on Jan. 27, 2015 http://en.wikipedia.org/w/index.php?title=Federated_database_system&oldid=571954221.

Wikipedia, "Mobile Web," Jan. 23, 2015, retrieved from the internet on Mar. 15, 2016 https://en.wikipedia.org/w/index.php?title=Mobile_Web&oldid=643800164.

Wollrath et al., "A Distributed Object Model for the Java System," Proceedings of the 2nd Conference on USENEX, Conference on Object-Oriented Technologies (COOTS), Jun. 17, 1996, pp. 219-231.

Wright et al., "Palantir Technologies VAST 2010 Challenge Text Records _ Investigations into Arms Dealing," Oct. 29, 2010, pp. 1-10.

Yang et al., "HTML Page Analysis Based on Visual Cues", A129, pp. 859-864, 2001.

Yang et al., "Retroactive Answering of Search Queries", WWW 2006 Edinburgh, Scotland, May 23-26, 2006, pp. 457-466.

Notice of Acceptance for Australian Patent Application No. 2014250678 dated Oct. 7, 2015.

Notice of Allowance for U.S. Appl. No. 12/556,318 dated Apr. 11, 2016.

Notice of Allowance for U.S. Appl. No. 12/556,318 dated Nov. 2, 2015.

Notice of Allowance for U.S. Appl. No. 13/196,788 dated Dec. 18, 2015.

Notice of Allowance for U.S. Appl. No. 13/247,987 dated Mar. 17, 2016.

Notice of Allowance for U.S. Appl. No. 13/826,228 dated Mar. 27, 2015.

Notice of Allowance for U.S. Appl. No. 14/102,394 dated Aug. 25, 2014.

Notice of Allowance for U.S. Appl. No. 14/108,187 dated Aug. 29, 2014.

Notice of Allowance for U.S. Appl. No. 14/135,289 dated Oct. 14, 2014.

Notice of Allowance for U.S. Appl. No. 14/139,628 dated Jun. 24, 2015.

Notice of Allowance for U.S. Appl. No. 14/139,640 dated Jun. 17, 2015.

Notice of Allowance for U.S. Appl. No. 14/139,713 dated Jun. 12, 2015.

Notice of Allowance for U.S. Appl. No. 14/148,568 dated Aug. 26, 2015.

Notice of Allowance for U.S. Appl. No. 14/192,767 dated Dec. 16, 2014.

Notice of Allowance for U.S. Appl. No. 14/192,767 dated Apr. 20, 2015.

Notice of Allowance for U.S. Appl. No. 14/264,445 dated May 14, 2015.

Notice of Allowance for U.S. Appl. No. 14/268,964 dated Dec. 3, 2014.

Notice of Allowance for U.S. Appl. No. 14/278,963 dated Sep. 2, 2015.

Notice of Allowance for U.S. Appl. No. 14/294,098 dated Dec. 29, 2014.

Notice of Allowance for U.S. Appl. No. 14/319,765 dated Nov. 25, 2016.

Notice of Allowance for U.S. Appl. No. 14/326,738 dated Nov. 18, 2015.

Notice of Allowance for U.S. Appl. No. 14/451,221 dated Aug. 4, 2015.

Notice of Allowance for U.S. Appl. No. 14/473,552 dated Jul. 24, 2015.

(56) References Cited

OTHER PUBLICATIONS

Notice of Allowance for U.S. Appl. No. 14/473,860 dated Feb. 27, 2015.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/504,103 dated May 18, 2015.
Notice of Allowance for U.S. Appl. No. 14/579,752 dated Apr. 4, 2016.
Notice of Allowance for U.S. Appl. No. 14/581,920 dated Sep. 2, 2016.
Notice of Allowance for U.S. Appl. No. 14/584,961 dated Jul. 13, 2017.
Notice of Allowance for U.S. Appl. No. 14/616,080 dated Apr. 2, 2015.
Notice of Allowance for U.S. Appl. No. 14/734,772 dated Apr. 27, 2016.
Notice of Allowance for U.S. Appl. No. 14/746,671 dated Jan. 21, 2016.
Notice of Allowance for U.S. Appl. No. 14/815,459 dated Sep. 23, 2016.
Notice of Allowance for U.S. Appl. No. 14/849,454 dated May 25, 2016.
Notice of Allowance for U.S. Appl. No. 14/923,364 dated May 6, 2016.
Notice of Allowance for U.S. Appl. No. 14/948,009 dated May 6, 2016.
Notice of Allowance for U.S. Appl. No. 15/152,017 dated Sep. 6, 2016.
Notice of Allowance for U.S. Appl. No. 15/159,622 dated Oct. 6, 2017.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14159535.5 dated May 22, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 19, 2016.
Official Communication for European Patent Application No. 14189344.6 dated Feb. 20, 2015.
Official Communication for European Patent Application No. 14189344.6 dated Jun. 27, 2017.
Official Communication for European Patent Application No. 14189344.6 dated Feb. 29, 2016.
Official Communication for European Patent Application No. 14189344.6 dated May 8, 2017.
Official Communication for European Patent Application No. 14189344.6 dated Jan. 9, 2017.
Official Communication for European Patent Application No. 14189347.9 dated Mar. 4, 2015.
Official Communication for European Patent Application No. 14189802.3 dated May 11, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15156004.2 dated Aug. 24, 2015.
Official Communication for European Patent Application No. 15165244.3 dated Aug. 27, 2015.
Official Communication for European Patent Application No. 15166137.8 dated Sep. 14, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15180515.7 dated Dec. 14, 2015.
Official Communication for European Patent Application No. 15183721.8 dated Nov. 23, 2015.
Official Communication for European Patent Application No. 15193287.8 dated Apr. 1, 2016.
Official Communication for European Patent Application No. 15201727.3 dated May 23, 2016.
Official Communication for European Patent Application No. 15201881.8 dated May 23, 2016.
Official Communication for European Patent Application No. 15201881.8 dated Sep. 27, 2017.
Official Communication for European Patent Application No. 15201924.6 dated Oct. 9, 2017.
Official Communication for European Patent Application No. 15202090.5 dated May 13, 2016.
Official Communication for European Patent Application No. 16152984.7 dated Mar. 24, 2016.
Official Communication for Great Britain Patent Application No. 1404457.2 dated Aug. 14, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2012433 dated Mar. 11, 2016.
Official Communication for Netherlands Patent Application No. 2012436 dated Nov. 6, 2015.
Official Communication for Netherlands Patent Application No. 2012437 dated Sep. 18, 2015.
Official Communication for Netherlands Patent Application No. 2013306 dated Apr. 24, 2015.
Official Communication for New Zealand Patent Application No. 622517 dated Apr. 3, 2014.
Official Communication for New Zealand Patent Application No. 624557 dated May 14, 2014.

(56) References Cited

OTHER PUBLICATIONS

Official Communication for New Zealand Patent Application No. 627962 dated Aug. 5, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.
Official Communication for U.S. Appl. No. 13/196,788 dated Oct. 23, 2015.
Official Communication for U.S. Appl. No. 13/196,788 dated Nov. 25, 2015.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/134,558 dated Oct. 7, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/225,084 dated Feb. 26, 2016.
Official Communication for U.S. Appl. No. 14/251,485 dated Oct. 1, 2015.
Official Communication for U.S. Appl. No. 14/264,445 dated Apr. 17, 2015.
Official Communication for U.S. Appl. No. 14/268,964 dated Sep. 3, 2014.
Official Communication for U.S. Appl. No. 14/278,963 dated Jan. 30, 2015.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Sep. 14, 2015.
Official Communication for U.S. Appl. No. 14/306,138 dated Mar. 17, 2016.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,147 dated Feb. 19, 2015.
Official Communication for U.S. Appl. No. 14/306,147 dated Jun. 3, 2016.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Feb. 1, 2016.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Mar. 17, 2016.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,765 dated Feb. 1, 2016.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/451,221 dated Apr. 6, 2015.
Official Communication for U.S. Appl. No. 14/473,552 dated Feb. 24, 2015.
Official Communication for U.S. Appl. No. 14/486,991 dated Mar. 10, 2015.
Official Communication for U.S. Appl. No. 14/490,612 dated Aug. 18, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/518,757 dated Dec. 1, 2015.
Official Communication for U.S. Appl. No. 14/518,757 dated Apr. 2, 2015.
Official Communication for U.S. Appl. No. 14/518,757 dated Jul. 20, 2015.
Official Communication for U.S. Appl. No. 14/578,389 dated Oct. 21, 2015.
Official Communication for U.S. Appl. No. 14/578,389 dated Apr. 22, 2016.

(56) References Cited

OTHER PUBLICATIONS

Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/579,752 dated Dec. 9, 2015.
Official Communication for U.S. Appl. No. 14/580,218 dated Jun. 26, 2015.
Official Communication for U.S. Appl. No. 14/580,218 dated Jun. 7, 2016.
Official Communication for U.S. Appl. No. 14/581,920 dated Mar. 1, 2016.
Official Communication for U.S. Appl. No. 14/581,920 dated Jun. 13, 2016.
Official Communication for U.S. Appl. No. 14/581,920 dated May 3, 2016.
Official Communication for U.S. Appl. No. 14/584,961 dated Mar. 9, 2017.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/639,606 dated Apr. 5, 2016.
Official Communication for U.S. Appl. No. 14/645,304 dated Jan. 25, 2016.
Official Communication for U.S. Appl. No. 14/698,432 dated Jun. 3, 2016.
Official Communication for U.S. Appl. No. 14/726,211 dated Apr. 5, 2016.
Official Communication for U.S. Appl. No. 14/726,353 dated Mar. 1, 2016.
Official Communication for U.S. Appl. No. 14/726,353 dated Sep. 10, 2015.
Official Communication for U.S. Appl. No. 14/734,772 dated Jul. 24, 2015.
Official Communication for U.S. Appl. No. 14/734,772 dated Oct. 30, 2015.
Official Communication for U.S. Appl. No. 14/800,447 dated Mar. 3, 2016.
Official Communication for U.S. Appl. No. 14/815,459 dated Jun. 13, 2016.
Official Communication for U.S. Appl. No. 14/841,338 dated Feb. 18, 2016.
Official Communication for U.S. Appl. No. 14/857,071 dated Mar. 2, 2016.
Official Communication for U.S. Appl. No. 14/874,690 dated Jun. 1, 2016.
Official Communication for U.S. Appl. No. 14/874,690 dated Dec. 21, 2015.
Official Communication for U.S. Appl. No. 14/948,009 dated Feb. 25, 2016.
Official Communication for U.S. Appl. No. 14/961,830 dated May 20, 2016.
Official Communication for U.S. Appl. No. 14/996,179 dated May 20, 2016.
Official Communication for U.S. Appl. No. 15/072,174 dated Jun. 1, 2016.
Official Communication for U.S. Appl. No. 15/159,622 dated May 10, 2017.
Official Communication for U.S. Appl. No. 15/159,622 dated Feb. 24, 2017.
Restriction Requirement for U.S. Appl. No. 13/839,026 dated Apr. 2, 2015.
Restriction Requirement for U.S. Appl. No. 14/857,071 dated Dec. 11, 2015.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Appacts, "Smart Thinking for Super Apps," http://www.appacts.com Printed Jul. 18, 2013 in 4 pages.
Apsalar, "Data Powered Mobile Advertising," "Free Mobile App Analytics" and various analytics related screen shots http://apsalar.com Printed Jul. 18, 2013 in 8 pages.
Capptain—Pilot Your Apps, http://www.capptain.com Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chaudhuri et al., "An Overview of Business Intelligence Technology," Communications of the ACM, Aug. 2011, vol. 54, No. 8.
Cohn et al., "Semi-supervised Clustering with User Feedback," Constrained Clustering: Advances in Algorithms, Theory, and Applications 4.1, 2003, pp. 17-32.
Countly Mobile Analytics, http://count.ly/ Printed Jul. 18, 2013 in 9 pages.
Distimo—App Analytics, http://www.distimo.com/app-analytics Printed Jul. 18, 2013 in 5 pages.
Flurry Analytics, http://www.flurry.com/ Printed Jul. 18, 2013 in 14 pages.
Google Analytics Official Website—Web Analytics & Reporting, http://www.google.com/analytics.index.html Printed Jul. 18, 2013 in 22 pages.
Gorr et al., "Crime Hot Spot Forecasting: Modeling and Comparative Evaluation," Grant 98-IJ-CX-K005, May 6, 2002, 37 pages.
Gu et al., "Record Linkage: Current Practice and Future Directions," Jan. 15, 2004, pp. 32.
Hansen et al. "Analyzing Social Media Networks with NodeXL: Insights from a Connected World", Chapter 4, pp. 53-67 and Chapter 10, pp. 143-164, published Sep. 2010.
Hua et al., "A Multi-attribute Data Structure with Parallel Bloom Filters for Network Services" HiPC 2006, LNCS 4297, pp. 277-288, 2006.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kontagent Mobile Analytics, http://www.kontagent.com/ Printed Jul. 18, 2013 in 9 pages.
Localytics—Mobile App Marketing & Analytics, http://www.localytics.com/ Printed Jul. 18, 2013 in 12 pages.
Manno et al., "Introducing Collaboration in Single-user Applications through the Centralized Control Architecture," 2010, pp. 10.
Mixpanel—Mobile Analytics, https://mixpanel.com/ Printed Jul. 18, 2013 in 13 pages.
Open Web Analytics (OWA), http://www.openwebanalytics.com/ Printed Jul. 19, 2013 in 5 pages.
Piwik—Free Web Analytics Software. http://piwik.org/ Printed Jul. 19, 2013 in18 pages.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Sigrist et al., "PROSITE, a Protein Domain Database for Functional Characterization and Annotation," Nucleic Acids Research 38.Suppl 1, 2010, pp. D161-D166.

(56) References Cited

OTHER PUBLICATIONS

StatCounter—Free Invisible Web Tracker, Hit Counter and Web Stats, http://statcounter.com/ Printed Jul. 19, 2013 in 17 pages.
TestFlight—Beta Testing on the Fly, http://testflightapp.com/ Printed Jul. 18, 2013 in 3 pages.
trak.io, http://trak.io/ printed Jul. 18, 2013 in 3 pages.
UserMetrix, http://usermetrix.com/android-analytics printed Jul. 18, 2013 in 3 pages.
Valentini et al., "Ensembles of Learning Machines," M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Notice of Allowance for U.S. Appl. No. 14/225,084 dated May 4, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/479,863 dated Mar. 31, 2015.
Notice of Allowance for U.S. Appl. No. 14/552,336 dated Nov. 3, 2015.
Official Communication for European Patent Application No. 14187996.5 dated Feb. 12, 2015.
Official Communication for European Patent Application No. 14191540.5 dated May 27, 2015.
Official Communication for European Patent Application No. 14200246.8 dated May 29, 2015.
Official Communication for European Patent Application No. 14200298.9 dated May 13, 2015.
Official Communication for European Patent Application No. 15181419.1 dated Sep. 29, 2015.
Official Communication for European Patent Application No. 15184764.7 dated Dec. 14, 2015.
Official Communication for European Patent Application No. 15201924.6 dated Apr. 25, 2016.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Netherlands Patent Application No. 2012438 dated Sep. 21, 2015.
Official Communication for Netherlands Patent Application No. 2012417 dated Sep. 18, 2015.
Official Communication for Netherlands Patent Application No. 2012421 dated Sep. 18, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 628161 dated Aug. 25, 2014.
Official Communication for US Patent Application No. 13/827,491 dated Dec. 1, 2014.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 14/141,252 dated Oct. 8, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/319,161 dated Jan. 23, 2015.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.
Official Communication for U.S. Appl. No. 14/571,098 dated Aug. 5, 2015.

(56) References Cited

OTHER PUBLICATIONS

Official Communication for U.S. Appl. No. 14/631,633 dated Sep. 10, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/746,671 dated Sep. 28, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/842,734 dated Nov. 19, 2015.
Notice of Acceptance for Australian Patent Application No. 2014250637 dated Mar. 26, 2018.
Official Communication for European Patent Application No. 15201924.6 dated May 18, 2018.
Official Communication for U.S. Appl. No. 15/293,140 dated Jan. 11, 2018.
Official Communication for U.S. Appl. No. 15/782,236 dated Jan. 14, 2019.
Official Communication for U.S. Appl. No. 15/406,195 dated Apr. 4, 2019.
Official Communication for U.S. Appl. No. 15/782,236 dated Mar. 19, 2019.
Official Communication for European Patent Application No. 19171133.2 dated Jun. 11, 2019.

* cited by examiner

| | | | | | | OPEN TIMELINE |
|---|---|---|---|---|---|---|
| Proxy × | | | | | | |
| Show 100 entries | | | ⬆ EXCEL ▼ ENRICH ▷ | | DOMAIN (1 / 1 values) ⚙ | |
| | | | Select all Deselect all Columns ▷ | | yahoo.com 100 | |
| DOMAIN ⬥ | RECEIVE_TIME ⬥ | SERIAL_NUMBER ⬥ | GENERATE_TIME ⬥ SOURCEADDRESS ⬥ DESTINATIONADDRESS ⬥ | | Show More Show Less Show All | |
| yahoo.com | 2015/08/30 24:28:41.000 UTC | 23A51D25A | 2015/11/30 24:28:46 458.769.53.156 8.254.237.858 | | SERIAL_NUMBER (10 / 100 values) ⚙ | |
| yahoo.com | 2015/08/30 24:27:11.000 UTC | 4V425382N | 2015/11/30 24:27:16 566.84.711.943 512.75.31.232 | | 23A51D25A | 1 |
| yahoo.com | 2015/08/30 24:15:11.000 UTC | 8S367221R | 2015/11/30 24:15:16 25.345.333.248 290.09.286.342 | | 4V425382N | 1 |
| yahoo.com | 2015/08/30 23:56:30.000 UTC | MVV1VV5B7 | 2015/11/30 23:56:35 289.58.252.32 76.208.57.313 | | 8S367221R | 1 |
| yahoo.com | 2015/08/30 23:45:00.000 UTC | C412GECE3 | 2015/11/30 23:45:05 223.281.61.254 221.4.255.241 | | MVV1VV5B7 | 1 |
| yahoo.com | 2015/08/30 22:36:30.000 UTC | 7D28F6218 | 2015/11/30 22:36:35 257.72.63.201 212.32.354.92 | | C412GECE3 | 1 |
| yahoo.com | 2015/08/30 21:59:00.000 UTC | 35153C3F4 | 2015/11/30 21:59:05 292.362.43.229 326.294.83.29 | | 7D28F6218 | 1 |
| yahoo.com | 2015/08/30 21:44:30.000 UTC | 7H5523884 | 2015/11/30 21:44:35 292.279.284.228 94.61.286.62 | | 35153C3F4 | 1 |
| yahoo.com | 2015/08/30 21:38:00.000 UTC | 76DJD4ESS | 2015/11/30 21:38:05 228.26.297.61 240.333.279.34 | | 7H5523884 | 1 |
| yahoo.com | 2015/08/30 21:18:30.000 UTC | 992VV8584 | 2015/11/30 21:18:35 25.338.325.213 333.465.75.459 | | 76DJD4ESS | 1 |
| yahoo.com | 2015/11/30 20:58:00.000 UTC | 35B8644A4 | 2015/11/30 20:58:05 85.337.81.33 316.77.76.345 | | 992VV8584 | 1 |
| Showing 1 to 100 of 100 entries | | | ◁ Previous [1] of 1 Next ▷ | | Show More Show Less Show All | |
| | | | | | GENERATE_TIME (10 / 100 values) ⚙ | |
| TIMELINE | | | | | 2015/08/20 22:30:45 | 1 |
| ☑ Proxy | | | | | 2015/08/21 21:25:25 | 1 |
| ☑ RECEIVE_TIME ☐ | | | | | 2015/08/22 09:17:05 | 1 |
| | | | | | BACK DRILL DOWN | |

FIG. 3C

ENRICHMENTS

SAVED ENRICHMENTS ← 420

These saved enrichments are available based on your current search results.

[SOURCE ADDRESS TIME SEARCH AROUND ▾] ← 422  [USER + COMPUTER SEARCH ▾]  [USER SEARCH ▾]

BASE REALM  ✕

DESCRIPTION
Searches BaseRealm for the specified column.

INPUTS

[Input Table ▾] [Proxy.Proxy]   [Coloumn ▾] [ACTION]
[Object ▾] [xxxcall]   [Property ▾] [xxxxxx]

OUTPUTS

[Output Table]

[ADD ▾]  [SAVE]

DATA TYPES ← 426

Proxy.Proxy
ACTION
ACTIONFLAGS
APPLICATION
BYTES
BYTES_RECEIVED
BYTES_SENT
CATEGORY
CPADDING
DESTINATIONADDRESS
DESTINATION_COUNTRY
DESTINATION_PORT
DESTINATION_USER
DESTINATION_ZONE
DOMAIN
ELAPSED_TIME_SEC
FLAGS

SYSTEMS AND INTERACTIVE USER INTERFACES FOR DYNAMIC RETRIEVAL, ANALYSIS, AND TRIAGE OF DATA ITEMS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application claims priority to U.S. Provisional Application No. 62/095,662, filed on Dec. 22, 2014, which is hereby incorporated by reference in its entirety.

BACKGROUND

Embodiments of the present disclosure generally related to analysis and triage of data items, and specifically to analysis and triage of suspected malware-related data items.

Detection of the presence of malware and/or other malicious activity occurring on a network is a highly important, but oftentimes challenging task. Detection of malware and malicious activity is of particular importance to organizations (for example, businesses) that maintain internal networks of computing devices that may be connected to various external networks of computing devices (for example, the Internet) because infection of a single computing device of the internal network may quickly spread to other computing devices of the internal network and may result in significant data loss and/or financial consequences.

Detection of the presence of malware and/or malicious activity on a monitored network may be performed through the examination of activity occurring on a monitored network over time. Previously, determination and identification of malware or malicious activity through the examination of network activity was a labor intensive task. For example, an analyst may have had to pore through numerous tracking logs and other information of the monitored network, manually discern patterns and perform analyses to gain additional context, and compile any information gleaned from such analyses.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure facilitate and streamline the process of retrieving and enriching data for analysis and triage. For example, the data analysis system may enable an analyst to more efficiently search for and view relevant data items, and to enrich viewed data items with additional contextual information.

Embodiments of the present disclosure relate to a data analysis system (also referred to herein as "the system") that may receive data comprising a plurality of raw data items from one or more data sources, such as a monitoring agent located in a monitored network. The received data may undergo initial filtering or analysis in order to eliminate non-relevant raw data items, such as by running the data against a whitelist and/or one or more rules. In addition, the data may be automatically subject to one or more enrichments in order to provide additional context to a user for analysis and/or triage, such as being run against one or more third party analysis services. The data may also undergo contextual or temporal analysis in order to provide the user with additional context.

In some embodiments, the received data may be sorted, scored, or prioritized using one or more scoring rules and/or algorithms. The system may generate a score, multiple scores, and/or metascores for each received raw data item, and may optionally rank or prioritize the data items based on the generated scores and/or metascores. Raw data items satisfying one or more score thresholds may be designated as "data item leads" such that they may be further investigated by a user using the system (as described below).

Raw data items associated with a data item lead may be searched and displayed to the user via an interactive user interface. According to various embodiments, the data analysis system may be used by the user to execute searches and additional enrichments against the received raw data items. A user may also, in some embodiments, pre-apply one or more enrichments to a search, such that the search will be executed and the selected enrichments automatically applied to the retrieved search results.

According to various embodiments, the data analysis system may group received raw data items based upon shared attribute values, allowing a user to process batches of raw data items that share common attributes values instead of on an individual level.

According to various embodiments, the data analysis system may be used to categorize received data and construct timelines, histograms, and/or other visualizations based upon the various attributes of the raw data items, allowing the user to quickly visualize the distribution of raw data items among different attribute values.

Accordingly, in various embodiments, the user may use the system to determine a likelihood that a data item lead is associated with malicious (or other) activity by searching, enhancing, and analyzing various raw data items associated with the data item lead.

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may enable a user to more quickly and accurately access, navigate, enrich, assess, and digest large numbers of raw data items than previous systems.

Further, the interactive and dynamic user interfaces described herein are enabled by innovations in efficient interactions between the user interfaces and underlying systems and components. For example, disclosed herein are improved methods of searching for raw data items, applying enrichments on the raw data items, displaying the enriched raw data items in a plurality of different formats (e.g., table, histogram, and timeline), wherein a user selection relating to a first format may automatically trigger an update of the data displayed in a second format. The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing interfaces for displaying raw data items are limited in various ways, and various embodiments of the disclosure provide significant improvements over such technology. Additionally, various embodiments of the present disclosure are inextricably tied to computer technology. In particular, various embodiments rely on detection of user inputs via graphical user interfaces, retrieval and enrichment of raw data items based on those user inputs, generation of tables, histograms, and timelines based upon the retrieved raw data items, and manipulation of a displayed table based upon a user selection relating to a histogram and/or timeline, and/or the like. Such features and others are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of data including histograms, times lines, and other data items.

In an embodiment, a computer system configured generate an interactive graphical user interface for accessing, enriching, and analyzing a plurality of raw data items is disclosed, the computer system comprising one or more computer readable storage devices configured to store a plurality of computer executable instructions and a plurality of raw data items, wherein a raw data item is associated with one or more attributes, wherein the one or more attributes comprise at least one time-based attribute; and one or more hardware computer processors in communication with the one or more computer readable storage devices. In some embodiments, the one or more hardware processors are configured to execute the plurality of computer executable instructions in order to cause the computer system to: identify a data item lead from the plurality of raw data items; receive one or more search parameters based at least in part upon an attribute associated with the data item lead; query the plurality of raw data items based at least in part upon the received search parameters to receive a first group of raw data items; and generate an interactive graphical user interface to display the first group of raw data items. In some embodiments, the interactive graphical user interface comprises a display area comprising a table that displays in a tabular format a first set of raw data items corresponding to at least a portion of the first group of raw data items; and at least one of: a display area displaying a histogram of at least the first set of raw data items, wherein data items of the first set of raw data items are grouped based at least in part upon shared attribute values of a selected attribute of the one or more attributes; and a display area displaying a timeline of at least a portion the first set of raw data items, based at least in part upon a time-based attribute of the at least one time-based attribute. The computer executable instructions may further be configured to cause the computer system to receive, via the interactive graphical user interface, a user selection of at least one shared attribute value associated with the histogram or at least one time-based attribute value associated with the timeline; and, in response to the receiving the user selection, update the table such that the table displays only raw data items of the first set of raw data items corresponding with the selected at least one common attribute value or the selected at least one time-based attribute value.

In some embodiments, a raw data item may correspond to an occurrence of a proxy request on a monitored network. In some embodiments, a raw data item may correspond to an occurrence of a process on a device on a monitored network.

In some embodiments, identifying a data item lead may comprise receiving the plurality of raw data items from one or more data sources, performing initial analysis or filtering on the plurality of raw data items, performing at least one enrichment on the plurality of raw data items, calculating scores for the plurality raw data items, and identifying a raw data item of the plurality of raw data items having a score satisfying a threshold as a data item lead.

In some embodiments, performing initial analysis or filtering on the plurality of raw data items comprises running the plurality of raw data items against a whitelist. Performing at least one enrichment on the plurality of data items may comprise performing an external analysis on the plurality of raw data items using one or more third party analysis systems. In some embodiments, performing at least one enrichment on the plurality of data items may comprise determining a frequency or distribution of an event associated with a raw data item of the plurality of raw data items.

In some embodiments, the plurality of computer executable instructions are configured to further cause to computer system to perform an aggregation of raw data items of the first group of raw data items based at least in part upon an attribute value.

In some embodiments, the first group of raw data items comprises raw data items of two or more data types, wherein the raw data items are separated into two or more tabs in the interactive user interface, based upon a type of the raw data items. The raw data items displayed by the histogram may comprise raw data items associated with a currently displayed tab. The raw data items displayed by the timeline may comprise raw data items associated with of all tabs of the two or more tabs.

In some embodiments, the selected attribute is associated with one or more attribute value groups, wherein the histogram groups data items of the first set of raw data items using the one or more attribute value groups.

In some embodiments, the selected attribute is selected from the one or more attributes based at least in part upon a selection by a human analyst. In some embodiments, the time-based attribute of the at least one time-based attribute is selected based at least in part upon a selection by a human analyst. In some embodiments, the first set of raw data items may comprise the first group of raw data items.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 3C illustrates an example interface for displaying retrieved raw data items associated with a data item lead, in accordance with some embodiments.

FIGS. 4B-4D illustrate an example interface for configuring data enrichments in accordance with some embodiments.

FIGS. 5B and 5C illustrate example interfaces for pre-applying enrichments to a search in accordance with some embodiments.

DETAILED DESCRIPTION

Figure 1:
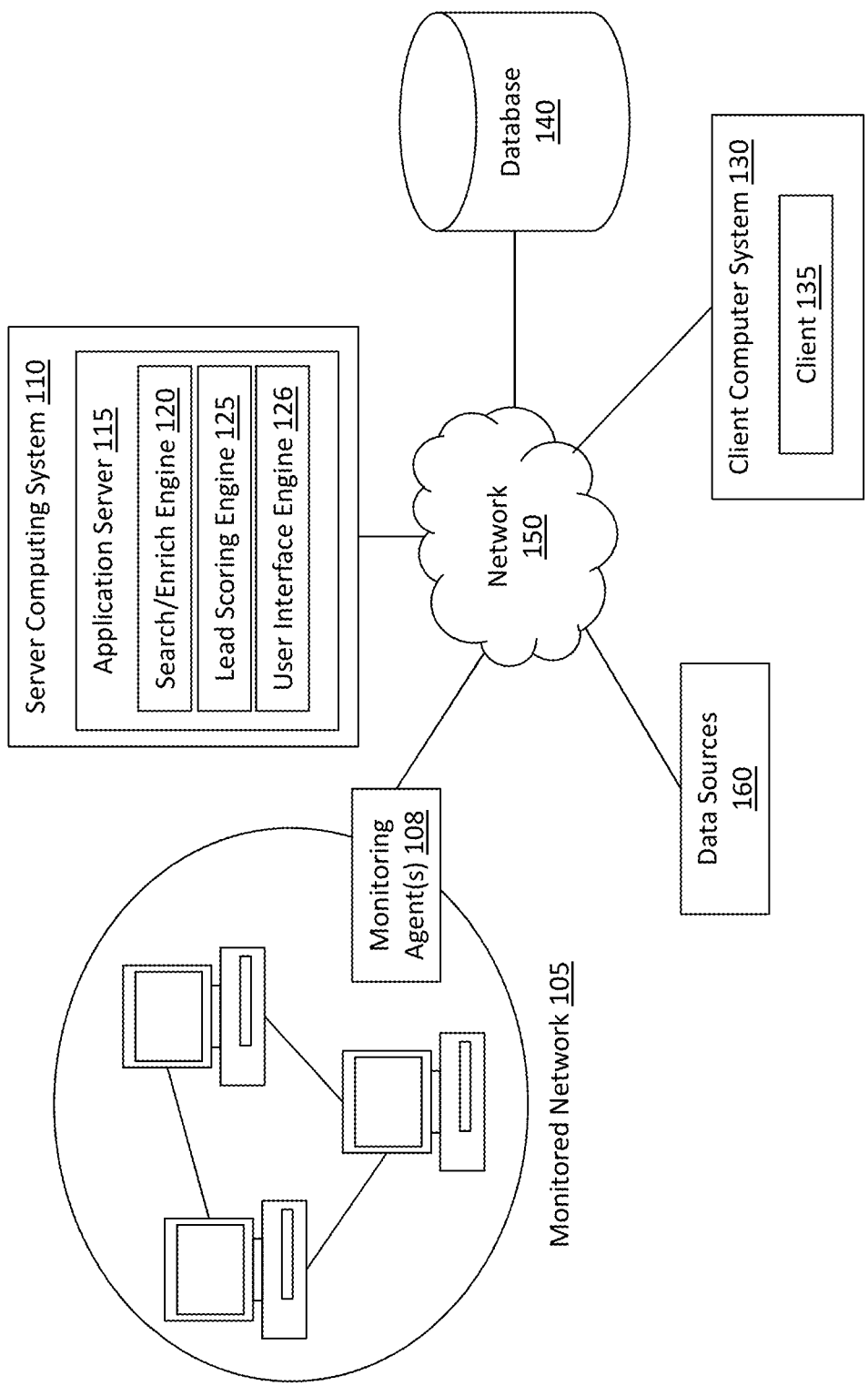
FIG. 1 is a block diagram illustrating an example data analysis system, according to embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

In order to facilitate an understanding of the systems and methods discussed herein, a number of terms are defined below. The terms defined below, as well as other terms used herein, should be construed broadly to include, without limitation, the provided definitions, the ordinary and customary meanings of the terms, and/or any other implied meanings for the respective terms. Thus, the definitions below do not limit the meaning of these terms, but only provide example definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (for example, Oracle database, mySQL database, and the like), spreadsheets, XML files, and text file, among others. The various terms "database," "data store," and "data source" may be used interchangeably in the present disclosure.

Data Item (Item), Data Object (Object), or Data Entity (Entity): A data container for information representing a specific thing, or a group of things, in the world. A data item may be associated with a number of definable properties (as described below). For example, a data item may represent an item such as a person, a place, an organization, an account, a computer, an activity, a market instrument, or other noun. A data item may represent an event that happens at a point in time or for a duration. A data item may represent a document or other unstructured data source such as an e-mail message, a news report, or a written paper or article. Each data item may be associated with a unique identifier that uniquely identifies the data item. The terms "data item,"

"data object," "data entity," "item," "object," and "entity" may be used interchangeably and/or synonymously in the present disclosure.

Raw Data Item: A data item received by a data analysis system for analysis. Raw data items may be received, for example, from one or more network monitors and/or other data sources, as described below. It is understood that the term "raw data item," as used in the present disclosure, may include data obtained through the performance of enrichments, including enrichments performed during pre-processing and/or post-processing.

Data Item Lead: A raw data item that has a calculated score, metascore, or alert level above a certain threshold, or has otherwise been flagged or designated for further analysis.

Item (or Entity or Object) Type: Type of a data item (for example, Person, Event, or Document). Data item types may be defined by an ontology and may be modified or updated to include additional data item types. An data item definition (for example, in an ontology) may include how the data item is related to other data items, such as being a sub-data item type of another data item type (for example, an agent may be a sub-data item of a person data item type), and the properties the data item type may have.

Properties: Also referred to herein as "attributes" or "metadata" of data items. A property of a data item may include any item of information associated with, and/or relevant to, the data item. At a minimum, each property of a data item has a property type and a value or values. For example, properties associated with a person data item may include a name (for example, John Doe), an address (for example, 123 S. Orange Street), and/or a phone number (for example, 800-0000), among other properties. In another example, properties associated with a computer data item may include a list of users (for example, user1, user2, and the like), and/or an IP (internet protocol) address, among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Overview

Embodiments of the present disclosure relate to a data analysis system (also referred to herein as "the system") that may retrieve and enrich data from a monitored network or other data source, and present the data to an analyst via a user interface for further analysis and triage.

Detection of the presence of malware and/or other malicious activity occurring on a network is a highly important, but oftentimes challenging task. Detection of malware and malicious activity is of particular importance to organizations (for example, businesses) that maintain internal networks of computing devices that may be connected to various external networks of computing devices (for example, the Internet) because infection of a single computing device of the internal network may quickly spread to other computing devices of the internal network and may result in significant data loss and/or financial consequences.

Detection of the presence of malware and/or malicious activity on a monitored network may be performed through the examination of activity occurring on the monitored network over time. Previously, determination and identification of malware or malicious activity through the examination of network activity was a labor intensive task. For example, an analyst may have had to pore through numerous tracking logs and other information of the monitored network, manually discern patterns and perform analyses to gain additional context, and compile any information gleaned from such analyses.

In various embodiments of the data analysis system described herein, the system may receive data comprising a plurality of raw data items from one or more data sources, such as a monitoring agent located in a monitored network. The raw data items may comprise any type of information that may be relevant for analyzing and detecting network activity (for example, the presence of malware and/or malicious behavior on the network). For example, such information may include proxy requests from endpoints (or other devices) within the monitored network to outside domains, requests between network devices in the monitored network, processes running on network devices in the monitored network, user logins on network devices in the monitored network, etc. In the context of malware detection, one example of a raw data item may be information associated with a software process running on a computer (for example, the name of the process, any associated processes, a time the process was activated, any actions taken by the process, and/or the like). Another example of a raw data item in the context of malware detection may be information associated with communications between a network device and an external domain or IP address (for example, an identifier of the network device, a time of the connection, an internal IP address of the network device, the external domain and/or IP address connected to, an amount of data transferred, and/or the like).

Network devices of the monitored network may include, for example, any type of computerized device, such as a desktop or laptop computer, a point of sale device, a smartphone, a server (for example, a proxy server), a network router, and/or the like. Monitoring agents may include, for example, software applications running on a network device, a dedicated hardware device (for example, a router configured to monitor network traffic), and/or the like.

The received data may undergo initial filtering or analysis in order to eliminate non-relevant raw data items, such as by running the data against a whitelist and/or one or more rules. In addition, the data may be automatically subject to one or more enrichments in order to provide additional context to a user for analysis and/or triage. For example, the data may be run against one or more third party analysis services, such as virus or malware detection services. The data may also undergo contextual or temporal analysis (to, for example, analyze a frequency or spread of a particular event in the network, and/or identify other events that occur temporally close to a particular event) in order to provide the user with additional context.

In addition, the received data may be sorted, scored, or prioritized using one or more scoring rules/algorithms. The system may generate a score, multiple scores, and/or metascores for each received raw data item, and may optionally rank or prioritize the data items based on the generated scores and/or metascores. For example, high priority data items may indicate a higher likelihood of malware or malicious behavior, and thus be of greater interest to an analyst. Raw data items satisfying one or more score thresholds may be designated as "data item leads" such that they may be further investigated by a user using the system (as described below).

According to various embodiments, the data analysis system may be used by a user (also referred to herein as an "analyst") to execute searches and/or additional enrichments against the received data item leads. Searches allow the user to access the various raw data items (including any enrichments, as mentioned above) associated with a data item lead in order to investigate a likelihood that the data item lead represents a data item of interest (for example, an indication of malicious activity, such as by malware). The use may use the system narrow the raw data item search results and/or view new sets of raw data items associated with the data item lead for analysis. Enrichments may be used by the user to supplement displayed raw data items with additional context beyond that provided by the initial analysis and/or initial enrichment. A user may, in some embodiments, also pre-apply one or more enrichments to a search, such that the search will be executed and the selected enrichments automatically applied to the retrieved search results (for example, the raw data items satisfying the search).

According to various embodiments, the data analysis system may group received raw data items based upon shared attribute values, allowing a user to, instead of having to pour through raw data items on an individual level, drill down or perform other types of actions on batches of raw data items that share common attributes values.

According to various embodiments, the data analysis system may be used to categorize received data and construct timelines, histograms, and/or other visualizations based upon the various attributes associated with the raw data items, allowing a user to quickly visualize the distribution of raw data items among different attribute values. For example, a user may categorize certain received raw data items, and construct a timeline of the raw data items of that category, allowing the user more insight into a chronology of events. Accordingly, in various embodiments, the user may determine a likelihood that a data item lead is associated with malicious (or other) activity by searching, enhancing, and analyzing various raw data items associated with the data item lead.

In various embodiments, and as mentioned above, the data analysis system may be used in various data analysis applications. Such applications may include, for example, financial fraud detection, tax fraud detection, beaconing malware detection, malware user-agent detection, other types of malware detection, activity trend detection, health insurance fraud detection, financial account fraud detection, detection of activity by networks of individuals, criminal activity detection, network intrusion detection, detection of phishing efforts, money laundering detection, and/or financial malfeasance detection. While, for purposes of clarity, the present disclosure describes the system in the context of malware (and/or other malicious activity) detection, examples of other data analysis applications are described in U.S. patent application Ser. No. 14/473,920, titled "External Malware Data Item Clustering and Analysis," filed on Aug. 29, 2014, and in U.S. patent application Ser. No. 14/139,628, titled "Tax Data Clustering," filed on Dec. 23, 2013. The entire disclosure of each of the above items is hereby made part of this specification as if set forth fully herein and incorporated by reference for all purposes, for all that it contains.

In the following description, numerous specific details are set forth to provide a more thorough understanding of various embodiments of the present disclosure. However, it will be apparent to one of skill in the art that the systems and methods of the present disclosure may be practiced without one or more of these specific details.

Description of the Figures

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure described above and/or below may include several novel features, no single one of which is solely responsible for its desirable attributes or which is essential to practicing the embodiments of the disclosure herein described.

FIG. 1 is a block diagram illustrating an example data analysis system 100, according to one embodiment. As shown in the embodiment of FIG. 1, system 100 includes an application server 115 running on a server computing system 110, a client 135 running on a client computer system 130, and at least one database 140. Further, the client 135, application server 115, and database 140 may communicate over a network 150, for example, to access data sources 160 and/or a monitored network 105.

In some embodiments, the application server 115 may include a search/enrichment engine 120, a lead scoring engine 125, and a user interface engine 126. The search/enrichment engine 120, lead scoring engine 125, and user interface engine 126 may be software modules as described below in reference to FIG. 7.

According to an embodiment, the search/enrichment engine 120 is configured to receive data for analysis from one or more data sources (e.g., data sources 160 and/or monitored network 105), comprising one or more raw data items. In addition, search engine 120 may receive one or more user inputs in order to search through and/or filter the received raw data items to be presented to the user for analysis and/or triage. In some embodiments, search/enrichment engine 120 may also be configured to enrich or supplement retrieved raw data items with additional information. For example, the search/enrichment engine 120 may receive data comprising raw data items containing source IP addresses corresponding to proxy requests associated with a monitored network, and further enrich the received data by accessing additional data sources to map the received sourced IP addresses with additional information related to the source IP addresses, such as computer hostname associated with the source IP address, computer owner, etc.

In some embodiments, the search/enrichment engine 120 may receive multiple types of data from one or more data sources, and enrich the data by correlating the data of different types. For example, the search/enrichment engine 120 may receive from the monitored network 105 proxy request data, endpoint log data, and monitoring agent data specifying processes running on the monitored network. The data may be enriched by correlating the network traffic associated with the proxy requests to software associated with the processes running on the network devices.

In an embodiment, the lead scoring engine 125 is configured to score received raw data items or groupings of raw data items according to one or more scoring strategies, wherein the score indicates an importance or priority for further analyzing the raw data items and/or groupings. For example, lead scoring engine 125 may execute one or more scoring strategies that analyze the occurrences of particular processes or process types in a network environment in order to identify possible malware or malicious behavior.

For example, lead scoring engine 125 may identify certain software processes that are run with high frequency or during unusual times as indicative of possible malware, and thus associate the processes with a high score for further analysis. In addition, additional information such as user information may be taken into account when identifying particular processes (e.g., certain types of users may be associated with certain types of processes, while those same processes being run on computing devices associated with other types of users may be indicative of possible malware or malicious behavior). In some embodiments, a high spread rate of occurrences of a particular process among computing devices in a network may be flagged by lead scoring engine 125 as a candidate for analysis. In some embodiments, different scores may be generated based upon different attributes and/or combinations of attributes associated with the data items or groupings of data items, which may then be aggregated to form an overall score or metascore for the data item.

In addition, in some embodiments lead scoring engine 125 may receive inputs from a user when generating scores for the received raw data items. For example, a first analyst may view the received data items or a subset thereof, and assign or modify scores of the raw data items for further review by a second analyst.

In an embodiment, the user interface engine 126 generates various user interfaces of the data analysis system as described below. In one embodiment, the search/enrichment engine 120, in conjunction with the lead scoring engine 125 and user interface engine 126, organizes and presents data items to the analyst/user. In the example of identifying data items leads, scored raw data items may be presented to the user according to the assigned scores. In the example of analyzing data item leads by searching, enriching, and/or analyzing raw data items associated with the data items leads, various analyses of the raw data items may be presented to the user. The user interfaces may be generated as web applications and/or dynamic web pages displayed within the client 135. The user interfaces are interactive such that a user may make selections, provide inputs, and/or manipulate outputs. Example user interfaces that may be used in some embodiments are discussed in detail below in conjunction with various figures.

The client 135 may represent one or more software applications or modules configured to present data and translate input, from the analyst, into requests for data analyses by the application server 115. In one embodiment, the client 135 and the application server 115 may be embodied in the same software module and/or may be included in the same computing system. However, several clients 135 may execute on the client computer 130, and/or several clients 135 on several client computers 130 may interact with the application server 115. In one embodiment, the client 135 may be a browser accessing a web service.

While the client 135 and application server 115 are shown running on distinct computing systems, the client 135 and application server 115 may run on the same computing system. Further, the cluster engine 120 and the workflow engine 125 may run on separate applications servers 115, on separate server computing systems, or some combination thereof. Additionally, a history service may store the results generated by an analyst relative to a given data item or set of data items.

In one embodiment, the data sources 160 provide data available to the application server 115 for analysis and triage. Such data sources may include relational data sources, web services data, XML data, and the like. Further, such data sources may include a variety of information and data, for example, personal information, financial information, tax-related information, computer network-related data, and/or computer-related activity data, among others. For example, the data sources may be related to customer account records stored by a financial institution. In such a case, the data sources may include a credit card account data, bank account data, customer data, and transaction data. The data may include data attributes such as account numbers, account balances, phone numbers, addresses, and transaction amounts, and the like. Of course, data sources 160 is included to be representative of a variety of data available to the server computer system 110 over network 150, as well as locally available data sources.

For example, in some embodiments, data sources 160 may include data pertaining to a monitored network 105. Monitored network 105 may correspond to any type of computer network where it is desired to perform data monitoring and analysis, such as a network for a business, bank, government agency, grocery store, etc. Monitored network 105 may comprise one or more computing devices, which include personal computers, laptops, servers, mobile devices, tablets, cash registers, ATM machines, checkout devices, point of sale devices, etc. In some embodiments, a monitored network 105 may comprise at least one endpoint device capable of connecting directly to external networks (e.g., a server capable of connecting to network 150), as well as at least one device not capable of connecting directly to an external network (e.g., an ATM machine of point of sale device that can only connect to other devices in monitored network 105).

In order to gather data from monitored network 105, monitored network 105 may be associated with one or more monitoring agents 108. In some embodiments, a monitoring agent 108 may be installed on at least one device of monitored network 105. In some embodiments, monitoring agents 108 may be installed on multiple devices of monitored network 105. In yet other embodiments, a monitoring agent 108 may be installed on a computing system external to monitored network 105 that is able to communicate with at least one device in monitored network 105. As mentioned above, monitoring agents 108 may include, for example, software applications running on a network device, a dedicated hardware device (for example, a router configured to monitor network traffic), and/or the like. As also mentioned above, network devices of the monitored network may include, for example, any type of computerized device, such as a desktop or laptop computer, a point of sale device, a smartphone, a server (for example, a proxy server), a network router, and/or the like.

Monitoring agents 108 may be used to gather any type of data desired to be monitored or analyzed by data analysis system 100. For example, monitoring agent 108 may be used to monitor proxy requests associated with the network. This may include requests between monitored network 105 and outside domains and/or requests made between different devices within monitored network 105. In some embodiments, monitoring agent 108 may be used to monitor network device logs, in order to determine what processes are running on one or more devices of monitored network 105.

In various embodiments, monitoring agents 108 may be used to monitor user logins on monitored network 105, other types of data related on monitored network 105, and/or any combination of the above examples. As mentioned above, data gathered by the monitoring agents 108 are referred to herein as "raw data items."

The database 140 may be a Relational Database Management System (RDBMS) that stores the data as rows in relational tables. The term "database," as used herein, may refer to an database (e.g., RDBMS or SQL database), or may refer to any other data structure, such as, for example a comma separated values (CSV), extensible markup language (XML), text (TXT) file, flat file, spreadsheet file, and/or any other widely used or proprietary format. While the database 140 is shown as a distinct computing system, the database 140 may operate on the same server computing system 110 as the application server 115.

Figure 2A:
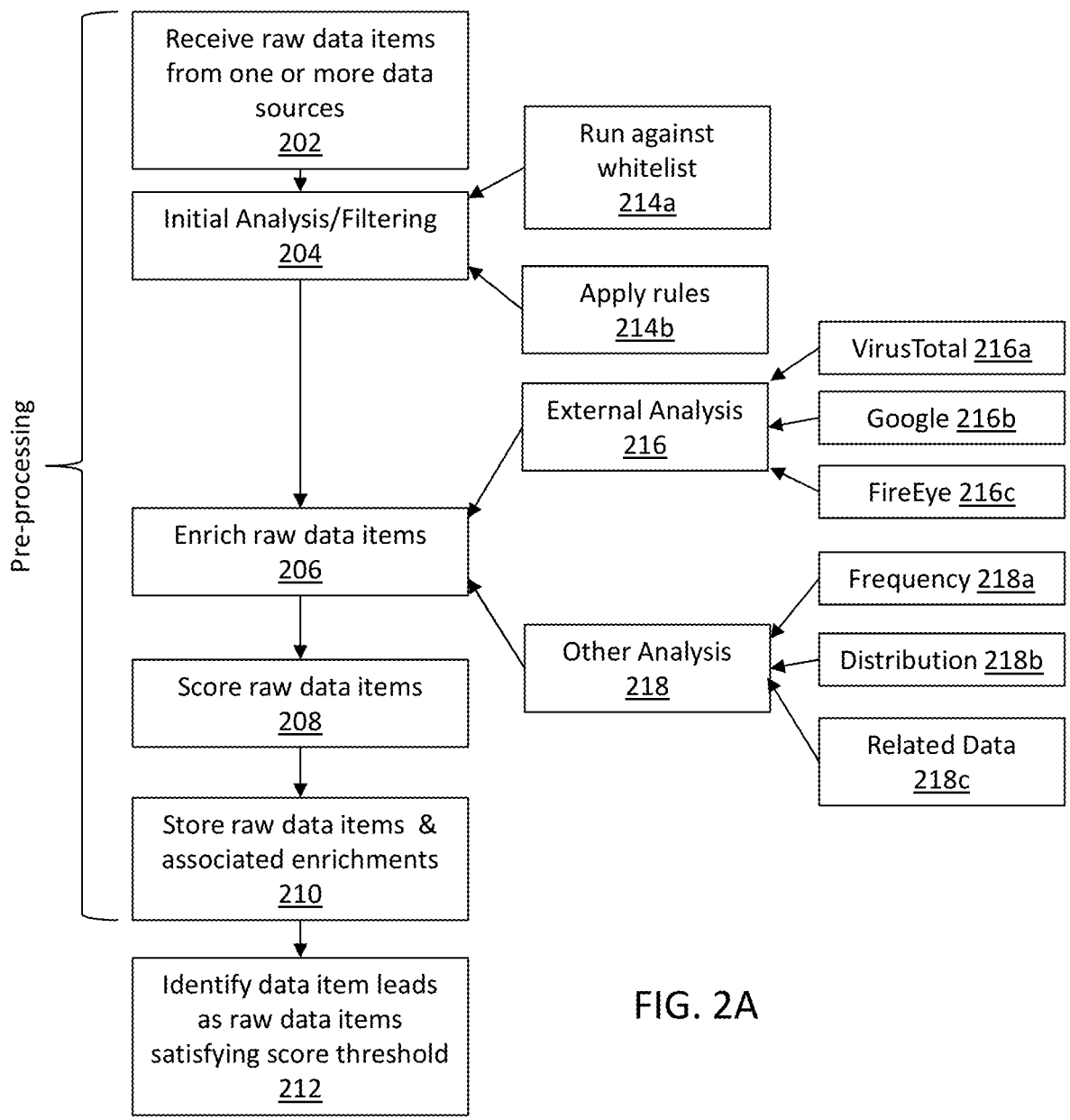
FIG. 2A illustrates a flowchart of an example method of identifying data item leads, according to embodiments of the present disclosure.

FIG. 2A is a flowchart of an example method of identifying data items leads, according to embodiments of the present disclosure. Although the method is described in conjunction with the system of FIG. 1, persons skilled in the art will understand that any system configured to perform the method, in any order, is within the scope of this disclosure. Further, the method illustrated in FIG. 2A may be performed in conjunction with various other methods described below including methods for grouping received data items by common attributes (FIG. 2B), performing enrichments on received data (FIG. 4A), etc.

In the embodiment of the flowchart of FIG. 2A, at block 202, data comprising one or more raw data items is received. The data may be received from a monitoring agent (e.g., monitoring agent 108 illustrated in FIG. 1), and/or one or more other data sources. For example, the received data may correspond to proxy requests on the monitored network, or to processes running on devices in the monitored network. It is appreciated that the above types are given for purposes of example, and that in other embodiments other types of data or combinations of different types of data may be received.

At block 204, the received data comprising the raw data items may be optionally subject to initial filtering or analysis. In some embodiments, the data may be run against a whitelist (block 214a), wherein raw data items may be designated as not being of interest, and therefore not data item leads. For example, if the data includes raw data items, each representing a process running on devices in a monitored network, the whitelist may specify processes that are known to be benign, and thus do not need to be subjected to further analysis or triage. This initial filtering allows for the amount of data needing to be analyzed to be quickly reduced, cutting down analyst workload, as well as storage and processing requirements. In some embodiments, the whitelist may be provided by a client 135, or by another party (e.g., a third party). In some embodiments, whitelisted data items may be removed from the received data, while in other embodiments, the whitelisted data may, instead of being removed, be categorized or scored (e.g., designating a data item as "low" priority for further analysis). Further details regarding scoring and/or categorizing of data items are described below.

In addition or in the alternative, other types of filtering or analysis may also be performed on the received raw data items. For example, one or more rules may be applied to the received data (block 214b). The rules may be used to filter out certain types of data, or to designate certain raw data items into certain predefined categories.

At block 206, the raw data items may be enriched or supplemented with additional information. In some embodiments, this may comprise subjecting the received data to external analysis (block 216). The external analysis is generally performed by one or more computing devices external to the system, however in some embodiments aspects (or all aspects) of the external analysis may be performed by the system. The external analysis of the data items may include, for example, analysis of the file data item by one or more third-party analysis providers (for example, VirusTotal (block 216a), FireEye (block 216c), and/or the like), aggregation of data items related to the submitted file data item (for example, performing a web search, such as a Google search (block 216b), based upon the raw data item), and/or the like. The one or more third-party analysis providers may then transmit one or more analysis information items back to the system, where it may be associated with the raw data items and displayed to the analyst. Any information determined and/or obtained via one or more external analysis processes may be referred to herein as external analysis information items, and such external analysis information items are associated with the data item analyzed.

In addition or in the alternative, the raw data items may also undergo other types of analysis and/or enrichment (block 218). For example, for data corresponding to occurrences of proxy requests, device processes, and/or the like on a monitored network, additional analysis may comprise determining the frequency that the particular request or process occurs on the network (block 218a). In some embodiments, the analysis may determine the distribution of occurrences in a given time period (block 218b). For example, it may be determined that a particular process was run by a certain number of devices in the monitored network within a specified time period.

In some embodiments, additional analysis/enrichment may also comprise associating the raw data items with related data (block 218c). For example, a raw data item corresponding to an occurrence of a process running on a device in a monitored network may be associated with occurrences of other processes running within a specified time period on the same device, with a parent process (if any), and/or the like. By performing these additional types of analysis and/or enrichment, the data may be provided with additional context that may be used to score/prioritize the raw data items, and/or aid a user during analysis and triage. The additional context/information obtained through this enrichment may also be referred to as analysis information items, and may be stored along with the raw data items in, for example, the data sources 160.

Example systems and methods for performing pre-processing on data items, including enrichments and/or external analysis, are disclosed in U.S. patent application Ser. No. 14/473,860, titled "Malware Data Item Analysis," filed on Aug. 29, 2014, which is hereby made part of this specification as if set forth fully herein and incorporated by reference for all purposes, for all that it contains.

In some embodiments, the raw data items may be scored at block 208. The score may indicate the importance of further analyzing the raw data item. For instance, a scoring strategy may be executed that examines the frequency and spread of processes running in a monitored network. For example, a data item corresponding to a process that runs on a large number of devices in a monitored network may be given a high score compared to a data item corresponding to a process that only runs on a smaller number of devices. Similarly, a process that experienced a large increase in distribution on a monitored network may be given a higher score than a process with relatively constant distribution. Thus, a data item with a higher score relative to a data item with a lower score may be considered more important to analyze.

In some embodiments, a raw data item may be scored by in accordance with one or more cluster rules/strategies. Example methods for scoring data items (and/or clusters of data items) are described in U.S. patent application Ser. No. 14/473,920, titled "External Malware Data Item Clustering and Analysis," filed on Aug. 29, 2014, the entire disclosure of which is hereby made part of this specification as if set forth fully herein and incorporated by reference for all purposes, for all that it contains.

In some embodiments, human input and analysis may be used when scoring the raw data items. For example, a first analyst may view the received raw data items and designate a score or priority level, indicating an importance for further analysis by a second analyst.

At block 210, the raw data items (along with any associated enrichments and/or scores) may be stored in a database or data store. At block 212, raw data items that satisfy a score threshold as identified as data item leads. For example, raw data items may be designated as being "high," "medium," or "low" priority, wherein only the data items having "high" priority are initially identified as data item leads. In some embodiments, only the identified data item leads are initially displayed to a user at a user interface, instead of all of the raw data items. This allows the user to begin the analysis focused on data items that have a high probability of yielding relevant results, and without being overwhelmed by a potentially very large number of raw data items.

A user may initiate searches on the data item leads, and/or specify additional enrichments to be performed on the data associated with the data items leads (as described below). Even though the user may initially only be presented with a subset of the raw data items (e.g., the data item leads), in some embodiments the entirety of the raw data items remain available for the user for searching and performing of enrichments. For example, in some embodiments, a user may, when analyzing data item leads corresponding to certain proxy requests from a monitored network, may search the entirety of the stored raw data items to find other proxy requests that occurred in the same time period as the displayed proxy requests, even though those raw data items were not initially displayed to the user as data item leads.

Figure 2B:
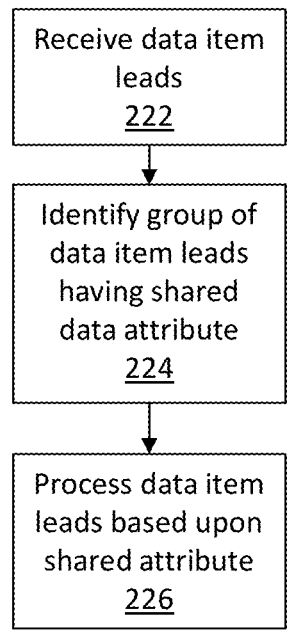
FIG. 2B illustrates a flowchart of an optional process for performing additional processing on the identified data item leads in accordance with some embodiments

FIG. 2B illustrates a flowchart of an optional process for performing additional processing on the identified data item leads in accordance with some embodiments. At block 222, data comprising one or more identified data item leads is received. The received data item leads are each associated with one or more attributes or properties. For example, a data item corresponding to a process running on a monitored network may contain attributes corresponding to process name, device the process was running on, time the process was running, software associated with the process, parent processes (if any), etc. The attributes for a data item lead may have been associated with the original raw data items received from one or more data sources (e.g., at block 202, illustrated in FIG. 2A), or received through the performance of one or more enrichments (e.g., at block 206, illustrated in FIG. 2A).

At block 204, a group of data item leads having one or more shared attribute values is identified. For example, a monitored network may comprise a number of different devices, each running one or more processes over different time periods. The data item leads corresponding to device process logs may be grouped by various attributes such as device attributes, process attributes, time attributes, and/or any combination thereof. For example, a data item group may comprise all data item leads corresponding to processes that were run on a particular device in the monitored network.

At block 206, the group of data item leads is processed based at least in part upon the identified shared attribute(s). For example, it may be determined that a certain type of process originating from a particular type of device may be indicative of malware or malicious behavior. Instead of having to comb through individual data item leads, how the data item leads are distributed with regards to particular attributes can be quickly determined. In addition, actions can be performed on the group of data item leads having shared attribute values as a batch instead of on the data item leads individually. For example, a particular attribute value (e.g., data items originating from a particular device) may be selected, and an action performed on all data items having that attribute value (e.g., flagging the data items for further analysis). In another example, an analyst may determine that a group of data item leads is not associated with malicious activity (or otherwise interesting for further analysis). In this example, the analyst may dismiss the group of data item leads as a whole, rather than investigating each data item lead individually.

In some embodiments, the processes illustrated in FIG. 2B may be performed on raw data items instead of data item leads. For example, when determining scores for raw data items, a score for a particular raw data item may be based at least in part upon processing performed on a group of raw data items having shared attribute values that the particular raw data item is a member of.

Displaying the Data

In some embodiments, when displaying data item to a user, received data items may be displayed as individual data entries, such as rows in a table or spreadsheet. In addition, in order to facilitate analysis, other formats for displaying the data may also be used, such as displaying the data in a batch format based upon shared attributes between different data items. Doing so may allow an analyst viewing the data to be able to quickly perform analysis or triage on groups of data items having common attributes, instead of having to comb through data items on an individual level.

Figure 3A:
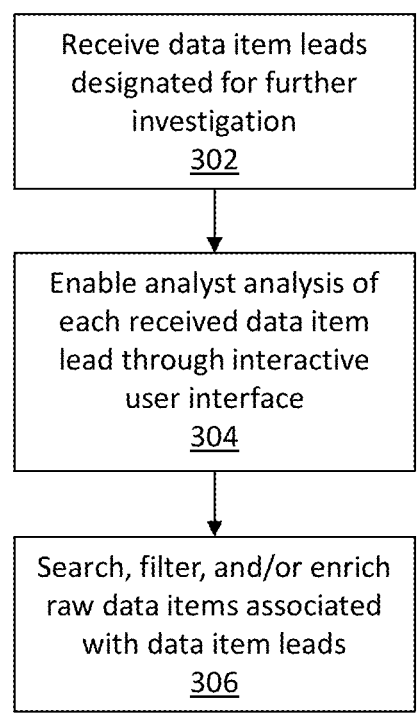
FIG. 3A illustrates a flowchart of a high level process for the processing of data item leads, in accordance with some embodiments.

FIG. 3A illustrates a flowchart of a high level process for the processing of data item leads, in accordance with some embodiments. At block 302, data comprising one or more data item leads is received. The data item leads correspond to data items that have been designated as deserving of further investigation (as described above in reference to FIGS. 2A and 2B). For example, in some embodiments the data item leads correspond to raw data items determined to have a score, metascore, or alert level meeting or exceeding a threshold value.

At block 304, a user or analyst is enabled to analyze each of the received data item leads via an interactive user interface, as described below. For example, in some embodiments the data item leads may be displayed using an interactive user interface containing one or more interactive controls.

At 306, a user or analyst performs a search, filter, and/or enrichment of raw data items associated with the data item leads. For example, after viewing a data item lead, the user may identify one or more search terms based on the attributes of the data item lead that warrants further investigation, or desire to obtain additional context information regarding the received data item lead through an enrichment.

The search, filter, and/or enrichment may be performed by the user interacting with one or more interactive controls on the interactive user interface.

Figure 3B:
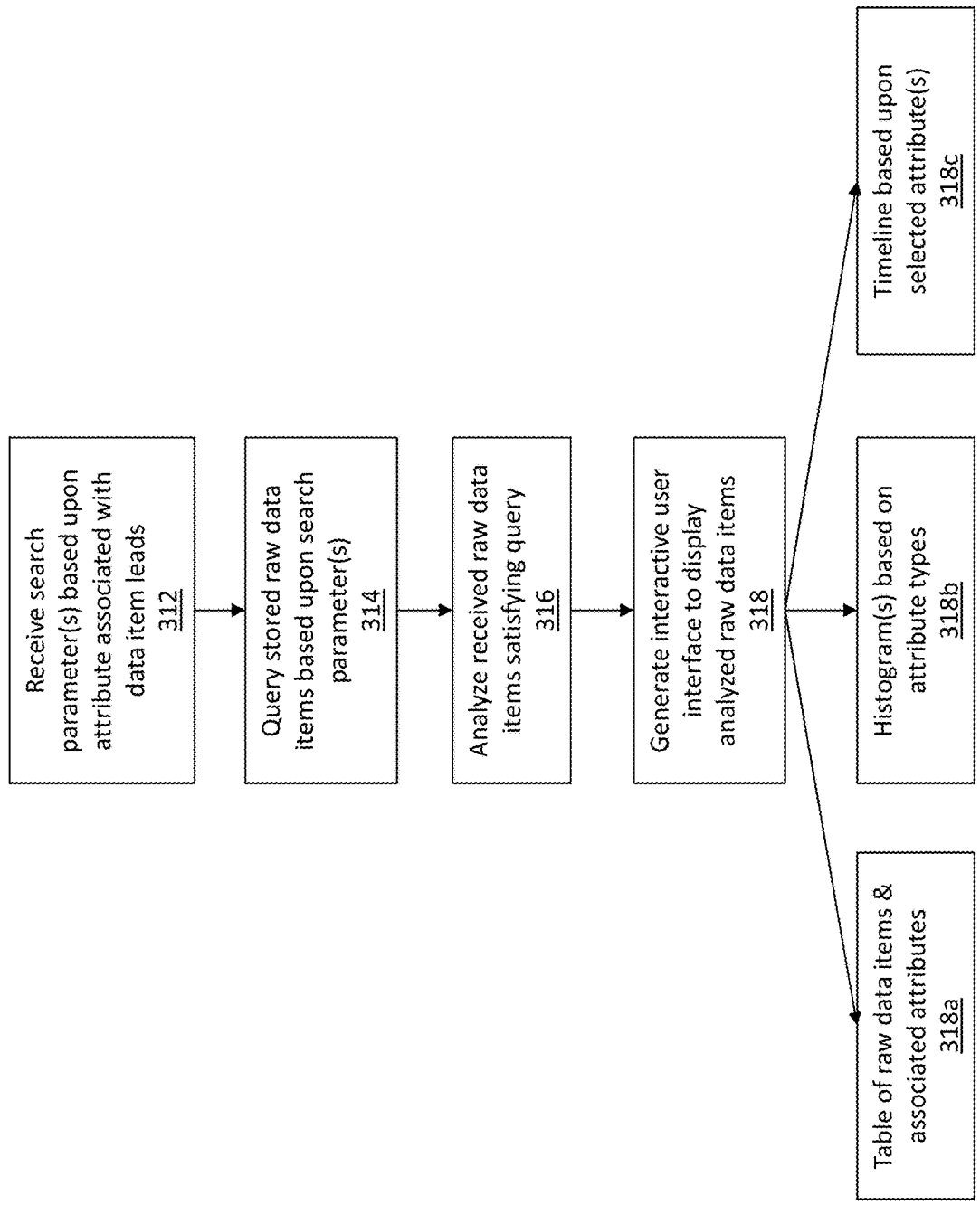
FIG. 3B illustrates a flowchart of a process for retrieving and displaying raw data items associated with data item leads, in accordance with some embodiments

FIG. 3B illustrates a flowchart of a process for retrieving and displaying raw data items associated with data item leads in accordance with some embodiments. At block 312, one or more search parameters are received, wherein the received search parameters are based at least in part upon one or more attributes associated with a data item lead (which attributes may include attributes originally associated with the data item lead, as well as attributes later associated with the data item lead as a result of performing one or more enrichments). In some embodiments, the search parameters may also specify a filter or an enrichment to be performed on one or more raw data items or data item leads.

At block 314, a query is formed based at least in part upon the search parameters, and used to query the stored raw data items. In addition, the parameters may also specify one or more filters and/or enrichments may also be performed on the queried data items.

At block 316, analysis may be performed on the received raw data items satisfying the query. For example, in some embodiments, the received raw data items may be categorized or grouped based upon attribute values. The analysis may also comprise one or more aggregations or other computations (e.g., computing a count of how many of the received raw data items have a particular attribute value, and/or the like).

At block 318, an interactive user interface is generated, allowing the received raw data items are displayed to the user. One or more formats may be used to display the received raw data items. For example, the interactive user interface may contain one or more different display areas, wherein the raw data items or a subset of the raw data items are displayed using a different format in each different display area. In some embodiments, the data items may be displayed as a table, wherein rows correspond to individual raw data items and columns correspond to raw data item attributes (block 318a). The raw data items may also be displayed as in batches or groups as a chart or histogram (block 318b), and/or as a timeline based upon one or more selected attributes (block 318c).

FIG. 3C illustrates an example user interface that may be used for displaying the analyzed raw data items associated with a data item lead, in accordance with some embodiments. The interface illustrated in FIG. 3C is divided into a plurality of display areas. For example, display area 322 may be used to display the individual raw data items in a tabular format, with columns corresponding to attributes of the raw data items. As used herein, the term "tabular format" is a broad term including its ordinary and customary meaning, including, but not limited to, any display format utilizing rows and columns, the rows corresponding to entities (e.g., raw data items) and column corresponding to attributes associated with the entities, or vice versa.

On the other hand, display area 324 groups raw data items together in histograms (e.g., graphical representations of distributions of data) based upon shared attribute values. As used herein the term "histogram" is a broad term including its ordinary and customary meaning, including, but not limited to, any representation (e.g., a visual display) of a distribution data (e.g., entities, data items, raw data items, etc.) according to one or more attributes associated with the data. For example, a histogram may be generated by sorting an attribute associated with one or more data items into one or more ranges or buckets (e.g., a time attribute may be associated with a plurality of buckets, each corresponding to a particular time period, wherein all data items having a time attribute value that falls within the same time period may be placed in the same bucket). The histogram may then be displayed in a chart or graph in which entries in the chart or graph correspond to the attribute value buckets or ranges instead of individual attribute values. For example, display area 324 contains a histogram corresponding to the "Serial Number" attribute, with individual entries corresponding to unique values of the attribute. The number of raw data items having each property value is counted and displayed. While the example of FIG. 3C shows a single value for each serial number, in other examples multiple raw data items may include a same attribute value. In addition, display area 324 may also contain bars, lines, or other graphical elements displaying the relative number of raw data items having a particular attribute value in comparison with other values, allowing the user to easily visualize the distribution of raw data items over different values of the attribute. In some embodiments, a user may interact with a control associated with a particular attribute value or value range/bucket, in order to perform an action on the raw data items having that value (e.g., drill down deeper, and/or flag the data items). For example, selection of a particular attribute value or value range/bucket of a histogram displayed in the display area 324 may cause the table of display area 322 to be automatically updated to display only raw data items that share the particular attribute value or value range/bucket (and also satisfy the search parameters). In some embodiments, display area 324 may contain multiple histograms each corresponding to a different attribute. For example, in the illustrated embodiment, display area 324 contains histograms for the Domain attribute, the Serial number attribute, and the Generate time attribute.

Display area 326 may be used to display a timeline of the raw data items and/or a subset of the raw data items. A timeline may be constructed when the raw data items are associated with one or more time-based attributes (e.g., a time that a proxy request occurred or a process was run). The user may identify one or more attributes or combinations of attributes specifying the raw data items to be included in the timeline via one or more user-selectable elements (for example, the check boxes to the left of the timeline). For example, the user may desire to view a timeline of proxy requests originating only from a particular device, a timeline of occurrences of processes of a certain types, and/or the like. Also, it is understood that in other embodiments, graphs or histograms may be constructed that are based upon other attributes of the received raw data items. In some embodiments, the time-based attribute used to construct the timeline is divided into a number of buckets or time frames each corresponding to a period of time (e.g., a minute, hour, or day).

In some embodiments, a user may interact with a control associated with a particular bucket or time frame of a displayed timeline, in order to perform an action on the raw data items falling within that bucket or time frame. For example, selection of a particular bucket or time frame of a timeline displayed in display area 326 may cause the table of display area 322 to be automatically updated to display only raw data items that fall within the selected bucket or time frame (and also satisfy the search parameters). In some embodiments, a user selection on a histogram in display area 324 may cause an update to the timeline in display area 326, or vice versa. For example, a selection of a particular attribute value or value range/bucket in a histogram may cause the timeline in display area 326 to reflect only the raw data items associated with the selected value or value range/bucket.

In some embodiments, raw data items displayed as a result of a search may correspond to one or more different data types. For example, a single search of stored data items may return data items corresponding to proxy requests, as well as raw data items corresponding to users on a monitored network. Raw data items that are of different data types may be accessed from different databases or from different tables in a database, and may be displayed together or in separate parts of the user interface. For example, as illustrated in FIG. 3C, display area 322 may contain one or more tabs 328, specifying the particular data type being viewed in display area 322. For example, other tabs may be displayed corresponding to other data types, each being selectable by a user. Selection of the various displayed tabs may cause a corresponding table of raw data items of the respective data types to be displayed in the display area 322. In addition, the tab selected at 328 may affect the data that is displayed in other display areas. For example, in some embodiments, the histogram displayed in display area 324 reflects only the data that is displayed in the current tab. In some embodiments, whether a particular display area reflects data from a single tab, multiple tabs, or all tabs may be configured by the user. For example, the display area 326 may contain one or more checkboxes or other interfaces elements, wherein the user may select which tabs that the displayed timeline will reflect. In addition, the user may specify the time-based attribute associated with the data type of each type. For example, the time-based attribute associated with the proxy data type is given as "receive time," while other data types may have different time-based attributes (or even multiple attributes) that can be used for timeline construction. When multiple time-based attributes associated with multiple data types are shown and selected in the display area 326, each different attribute may be shown in a difference color in the timeline.

Figure 3D:
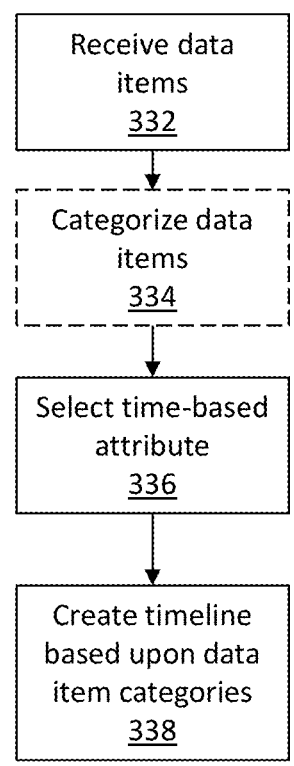
FIG. 3D illustrates a flowchart of a method for creating and displaying a timeline in accordance with some embodiments.

In an embodiment having multiple tabs 328, the data shown in table of display area 322 and histogram of display area 324 will only reflect data associated with a currently selected tab 328, while the timeline displayed in display area 326 will reflect data across all tabs 328. FIG. 3D illustrates a flowchart of a process for creating a timeline (for example, the timeline of display area 326 of FIG. 3C) in accordance with some embodiments. Timelines may be used when a user wishes to be able to identify subsets of events that are of interest, and inspect when the events happened in relation to each other.

At block 332, a plurality of raw data items are received. The received raw data items may be data items satisfying a search query associated with a data item lead, as described above. The received raw data items may include one or more raw data items that are of interest to a user, and one or more data items that may currently not be of interest to the user.

At optional block 334, the plurality of raw data items may be categorized. In some embodiments, categorization may be based upon one or more attributes of the data items (e.g., data items associated with a first device may be placed in a first category, while data items associated with a second device may be placed in a second category). In some embodiments, the categories may be defined by a user at a user interface. For example, a particular user may view the received data items, and designate certain data items as being "interesting," "suspicious," or otherwise deserving of further analysis. In some embodiments, one or more rules may be used to automatically categorize data items based at least in part upon one or more data item attributes. For example, data items corresponding to proxy requests to a particular domain may be automatically placed in a first category in accordance with one or more rules. In some embodiments, all received data items will be categorized, although in other embodiments, it is not necessary for all data items to receive a categorization.

At block 336, a time-based attribute of the raw data items is selected. As mentioned above, different data types may be associated with different time-based attributes. For example, a "proxy" data type may be associated with a "receive time" attribute, reflecting a time that a proxy request was received. In some embodiments, a data type may have multiple time-based attributes (e.g., a start time and an end time).

At block 338, a timeline is created based upon one or more selected time-based attributes and/or data item categories. For example, the timeline may include each of the time-based attributes selected by the user. In another example, the timeline may include events corresponding to data items marked by the user as being "suspicious." In some embodiments, the system may automatically select all time-based attributes associated with raw data items satisfying the query for display in the timeline. In some embodiments, if multiple data items correspond to events occurring within the same time period, the timeline may be displayed in the form of a bar chart or histogram (e.g., as shown in display area 326 in FIG. 3C), indicating a number of data items associated with each time period. By creating a timeline or histogram, the user may be able to quickly discern patterns, significant events, and/or shifts in distribution of the data items. For example, if the prevalence of a category of process running on the network increases dramatically over a particular time period, the user will be able to easily detect the change using the timeline/histogram. In some embodiments, multiple timelines based upon different categories may be constructed. The multiple timelines may be overlaid, differentiated using overlapping bars of different colors, and/or other types of visual indicators. This may be especially useful in cases where the user wishes to analyze correlations between occurrences of a particular category of data item and occurrences of a different category of data item.

Applying Enrichments

Figure 4A:
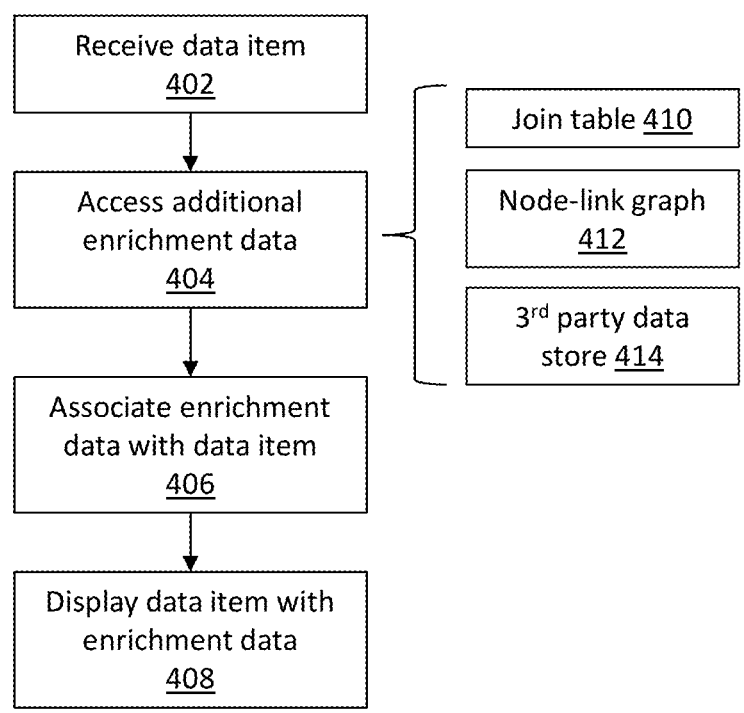
FIG. 4A illustrates a flowchart of performing data enrichment in accordance with some embodiments.

FIG. 4A illustrates a flowchart of a process for applying data enrichments to displayed raw data items, in accordance with some embodiments. At block 402, one or more data items to be enriched are received. The data items may comprise all raw data items currently being displayed to the user, raw data items satisfying one or more user-defined criteria, and/or raw data items specified by the particular enrichment to be applied. In addition, the enrichment may specify specific attributes or properties of the raw data items. For example, for raw data items corresponding to proxy requests from a monitored network to a particular domain, a user may desire to find out what other proxy requests originated from each source IP of the monitored network around the same time the requests to the particular domain were made (e.g., within 5 minutes). Thus, an enrichment configured to retrieve the additional proxy requests may specify the source IP and time attributes of the raw data items.

At block 404, one or more additional data sources containing the desired enrichment data are accessed. In some embodiments, the data source may comprise one or more data items stored as a table (block 410), such that the enrichment data may be retrieved by executing one or more table joins. In some embodiments, the data source may comprise data items stored as a data item-centric data model, a node-link graph, and/or other type of data model (block 412). In some embodiments, the additional data may be retrieved from a third party data source (block 414). For example, an API call may be used to access a third party application or data source containing the desired enrichment information. For example, data associated with particular raw data item(s) may be sent to a third party application (e.g., VirusTotal) in order to retrieve data (e.g., a rating indicating the presence of malware) related to the submitted raw data item(s).

At block 406, the additional data is retrieved from the data source and associated with the raw data items to be enriched. For example, in the above example of identifying proxy requests originating from the same source IP within a particular time period as proxy requests to a particular domain, the additional data may comprise a table containing proxy request data items, and proxy request data items that meet the criteria specified by the enrichment (e.g., occurring within 5 minutes of a proxy request to the particular domain on the same source IP) are associated with the original raw data items.

At block 408, the raw data items are displayed with the additional enrichment data. In some embodiments, the additional enrichment data may be displayed as one or more additional columns in the table containing the original raw data items. In some embodiments, the additional enrichment data may be displayed in a separate tab or table in the user interface.

Figure 4B:
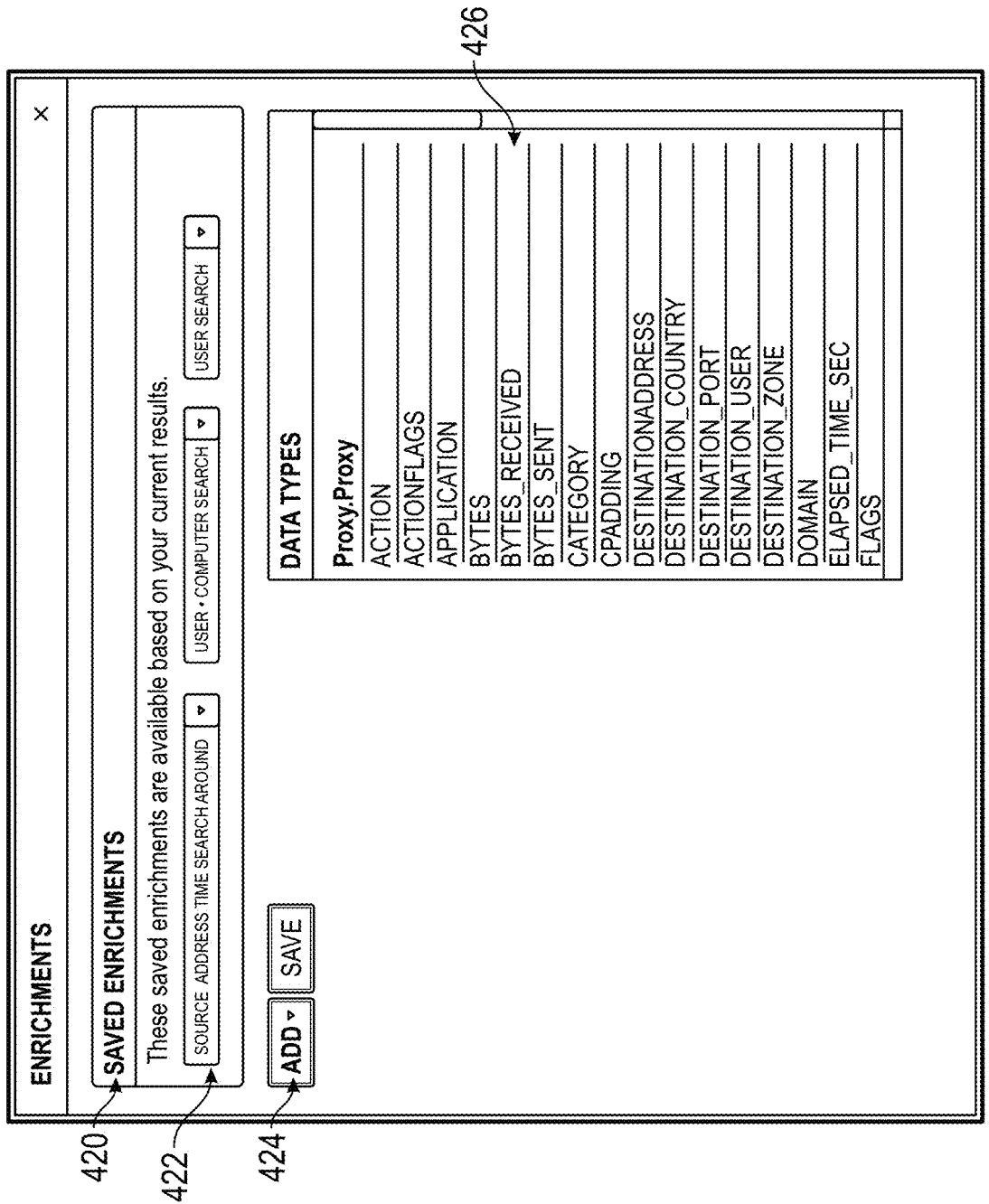

In some embodiments, a base set of enrichments may be provided to the user, which the user can then configure and customize. FIG. 4B illustrates an example interface for a user to configure enrichments and/or create new enrichments, in accordance with some embodiments. A plurality of existing enrichments 422 may be displayed to the user at 420. For example, in the illustrated figure, existing enrichments include a "source address time search around enrichment" (for a proxy request data item, search for other requests from the same source IP during a similar time period), a "user search" enrichment (identify a user associated with a proxy request data item), and a "user+computer search" enrichment (identify a user and computer associated with a proxy request data item). By clicking on the existing enrichments, a user is able to apply, configure, or modify the enrichment.

Figure 4C:
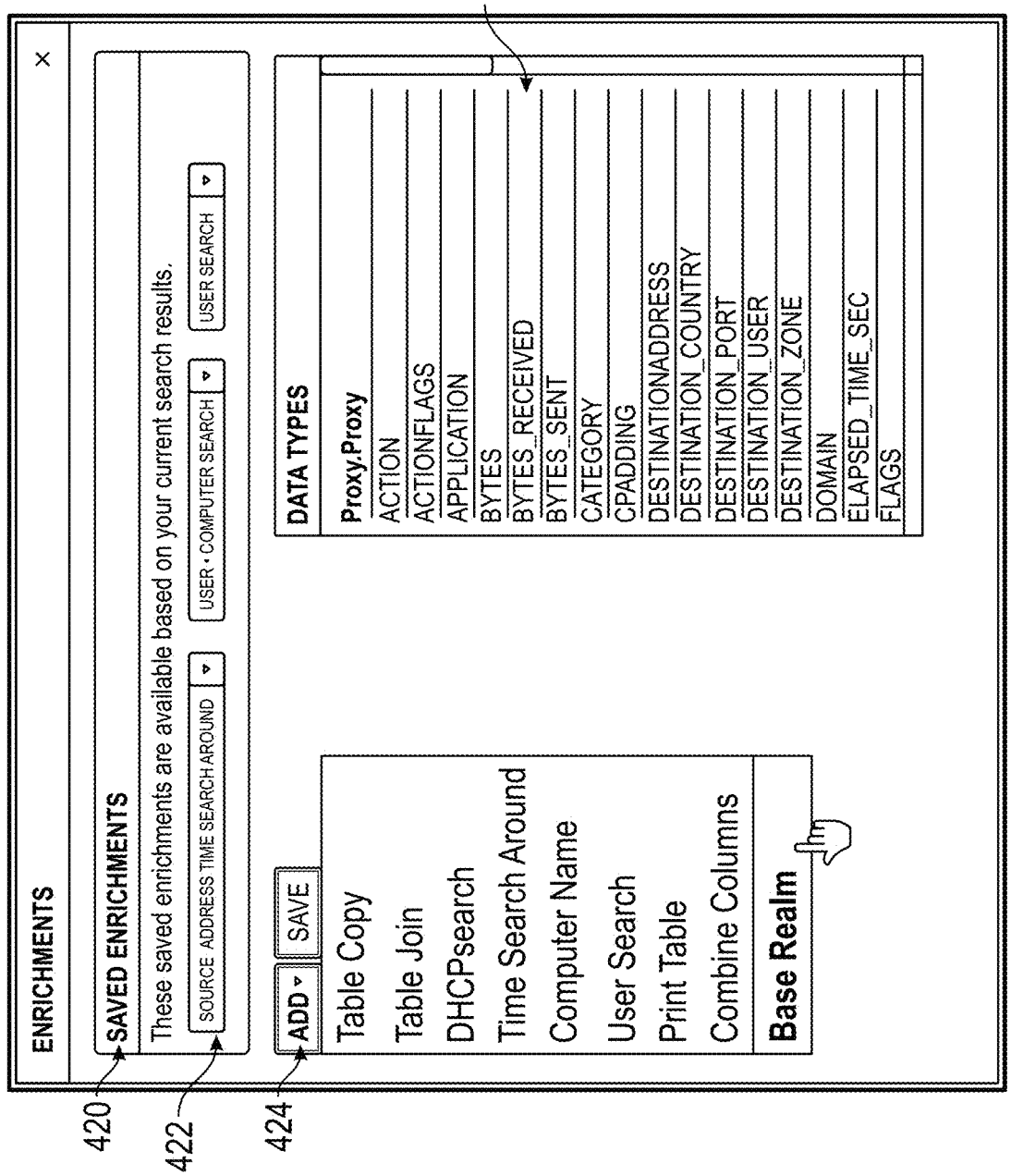

In addition, the interface may contain a control 424 that allows a user to add a new enrichment. In some embodiments, when a user clicks control 424 to add a new enrichment, one or more templates corresponding to common types of enrichments may be displayed (FIG. 4C). Clicking on a template may bring up an interface for the user to configure and customize a new enrichment (FIG. 4D). For example, the interface illustrated in FIG. 4D shows the user creating a new enrichment that examines the "Action" column of a Proxy table, and looks up an API call corresponding to the actions. The interface may also contain a control allowing the user to specify whether the enrichment data (e.g., API call) is to be displayed as additional columns in the same table as the enriched data items, or as a separate table or tab.

In some embodiments, the interface may display a list of available data types at display area 426, corresponding to data types associated with the properties of the data items. In some embodiments, the list of data types may be used to indicate to a user which data types have been used in configuring a particular enrichment. For example, as shown in FIG. 4D, the data types for "Proxy" and "Action" are greyed out, indicating that they are being used in the configuration of the current enrichment.

After a user has finished configuring the enrichment, the enrichment may be saved as a JSON or other type of plug-in in the backend. Saved enrichments will reference the data set that they apply to. For example, the enrichment illustrated as being configured by the user in FIG. 4D applies to a proxy data set. In some embodiments, when a user is view a set of data items from a particular data set, saved enrichments that reference that data set may appear in a drop-down menu or otherwise made available to the user, allowing the user to easily select and execute the enrichment.

Pre-Applying Enrichments to Searches

In some embodiments, a user, when performing a search, may wish to pre-apply one or more enrichments to the search, such that the results of the search are returned to the user with the enrichment data included, in a single step. For example, a user may wish to perform a search for all raw data items corresponding to proxy requests to a particular domain. In addition, the user may wish to know the names of the computers corresponding to the source IP addresses of the raw data items. Therefore, the user may wish to pre-apply an enrichment that looks up computer names for source IP addresses, such that when the search is executed, the computer names corresponding to the source IP addresses are automatically included with the search results.

Figure 5A:
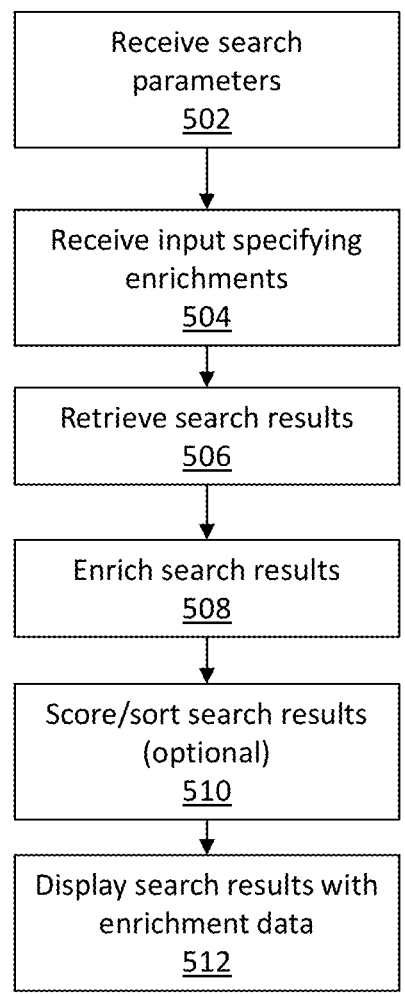
FIG. 5A illustrates a flowchart of a method for pre-applying enrichments to a search in accordance with some embodiments.
Figure 5B:
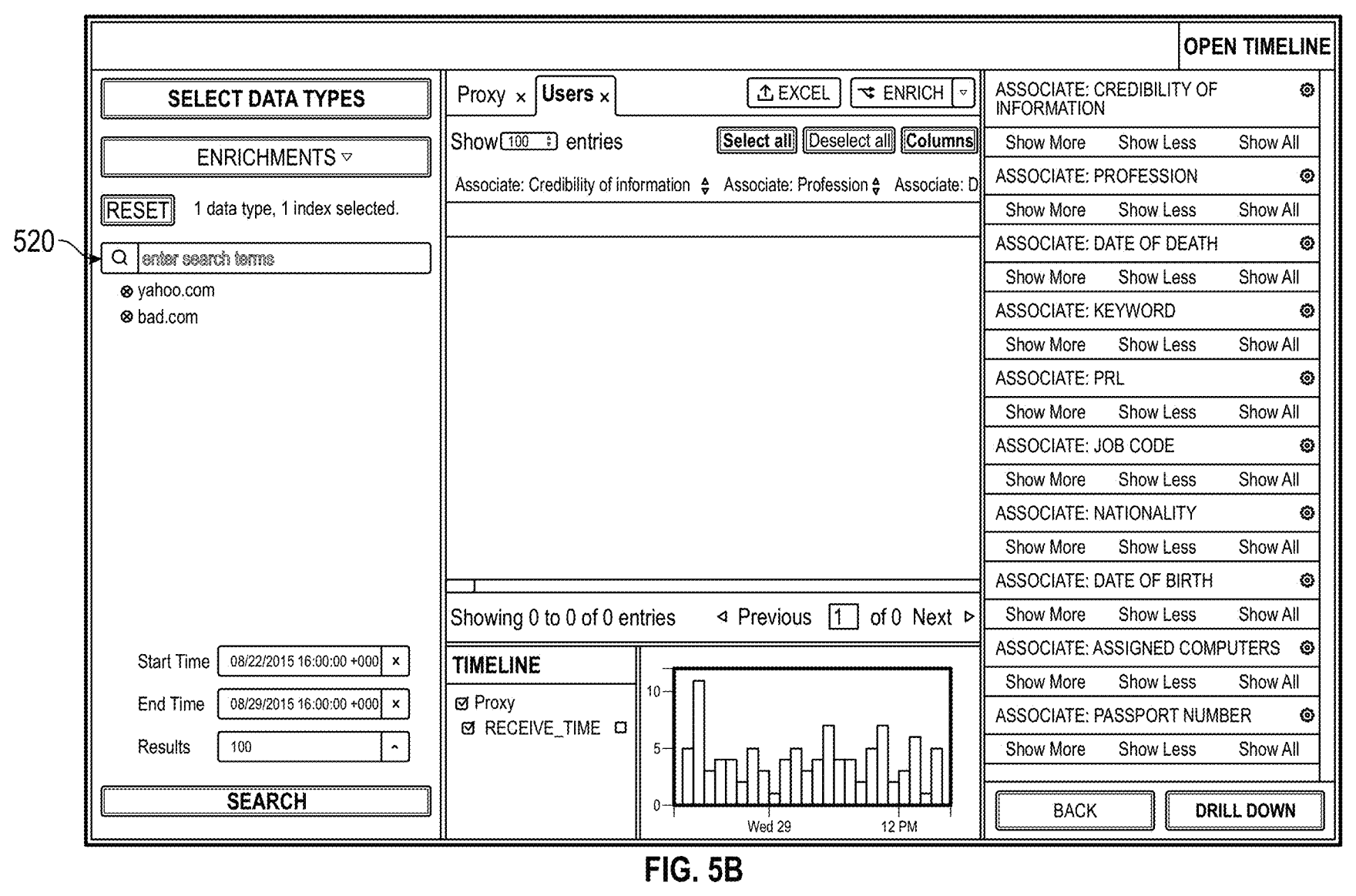
Figure 5C:
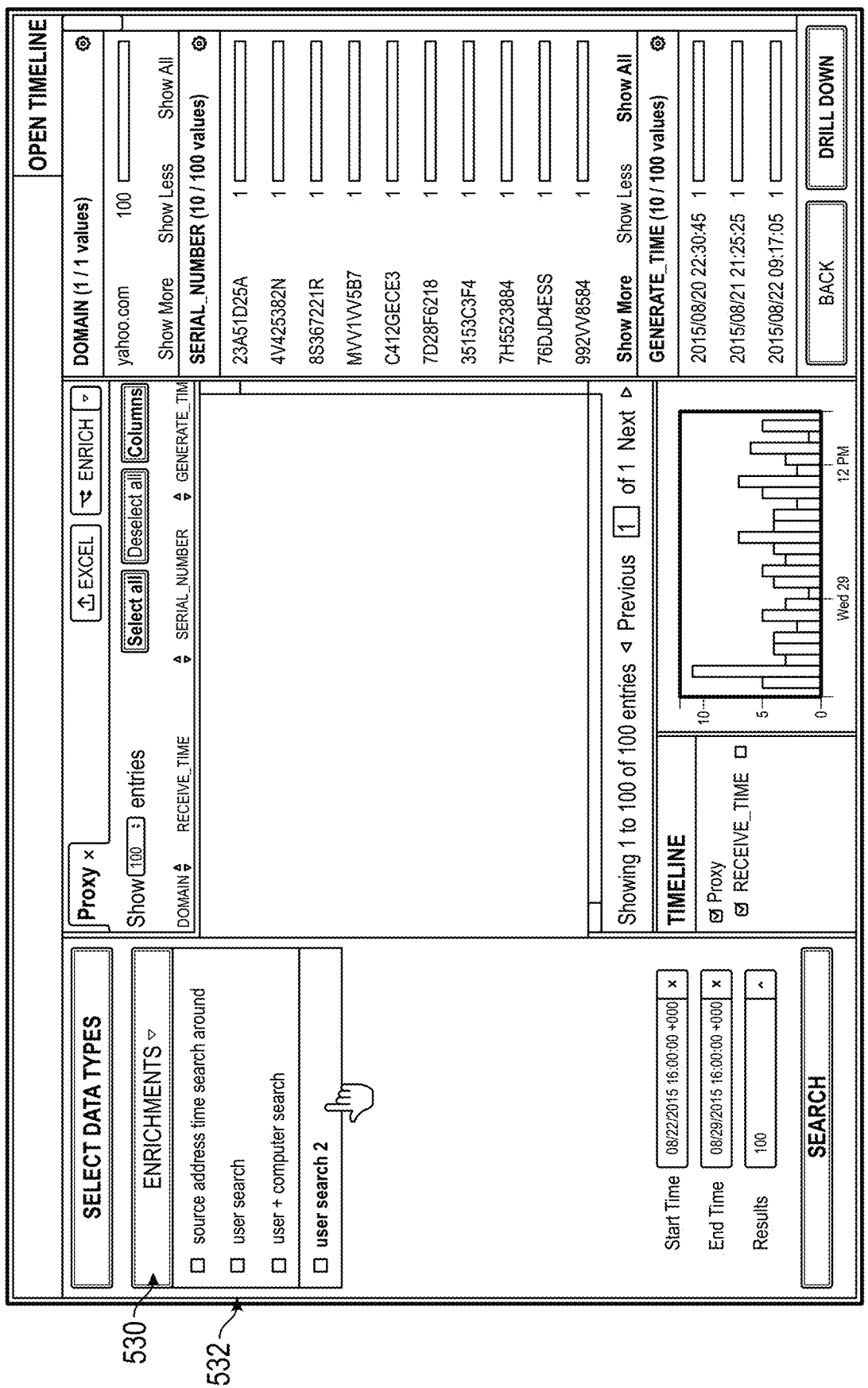

FIG. 5A illustrates a flowchart of an example process for pre-applying enrichments to searches. FIGS. 5B and 5C illustrate example interfaces wherein a user may perform a search with pre-applied enrichments.

At block 502, one or more search parameters are received from a user. For example, as illustrated in FIG. 5B at 520, a user may specify a search that searches for proxy requests directed to the "yahoo.com" domain that occurred within a specified time period.

At block 504, one or more inputs specifying enrichments to be applied to the search are received. For example, FIG. 5C illustrates a drop-down menu containing saved enrichments 532 that can be accessed by clicking on button 530. In some embodiments, different enrichments may be directed to different data sets. Enrichments that are not directed to the data set being searched may be grayed out, not displayed, or otherwise made un-selectable by the user.

At block 506, search results corresponding to the search parameters are retrieved. At block 508, the retrieved search results are automatically enriched in accordance with the specified enrichments. In some embodiments, the data may be enriched using the method illustrated in FIG. 4A and described above.

In some embodiments, at block 510, the search results may optionally be scored and/or sorted, in accordance with any of the methods described above.

At block 512, the search results, comprising data items and enrichment data, are displayed to the user at a user interface. In some embodiments, wherein the data items are displayed in a tabular format (e.g., as illustrated in FIG. 3B), with rows corresponding to data items and columns corresponding to data item attributes, the enrichment data may be displayed as additional columns. Alternatively, the enrichment data may be displayed in a separate tab or table from the original data items. How the enrichment data is to be displayed may be based upon the format or type of enrichment data. For example, the enrichment data may be more suited to be displayed as additional columns if there is a one-to-one correlation between the original data items and enrichment data, while a separate tab or table may be more appropriate if there may be multiple pieces of enrichment data for each data item (or vice versa).

Data Item-Centric Data Model

To provide a framework for the description of specific systems and methods provided above and below, an example database system 1210 using an ontology 1205 will now be described in reference to FIGS. 6A-6C. This description is provided for the purpose of providing an example and is not intended to limit the techniques to the example data model, the example database system, or the example database system's use of an ontology to represent information.

In one embodiment, a body of data is conceptually structured according to data item-centric data model represented by ontology 1205. The conceptual data model is independent of any particular database used for durably storing one or more database(s) 1209 based on the ontology 1205. For example, each object of the conceptual data model may correspond to one or more rows in a relational database or an entry in Lightweight Directory Access Protocol (LDAP) database, or any combination of one or more databases.

Figure 6A:
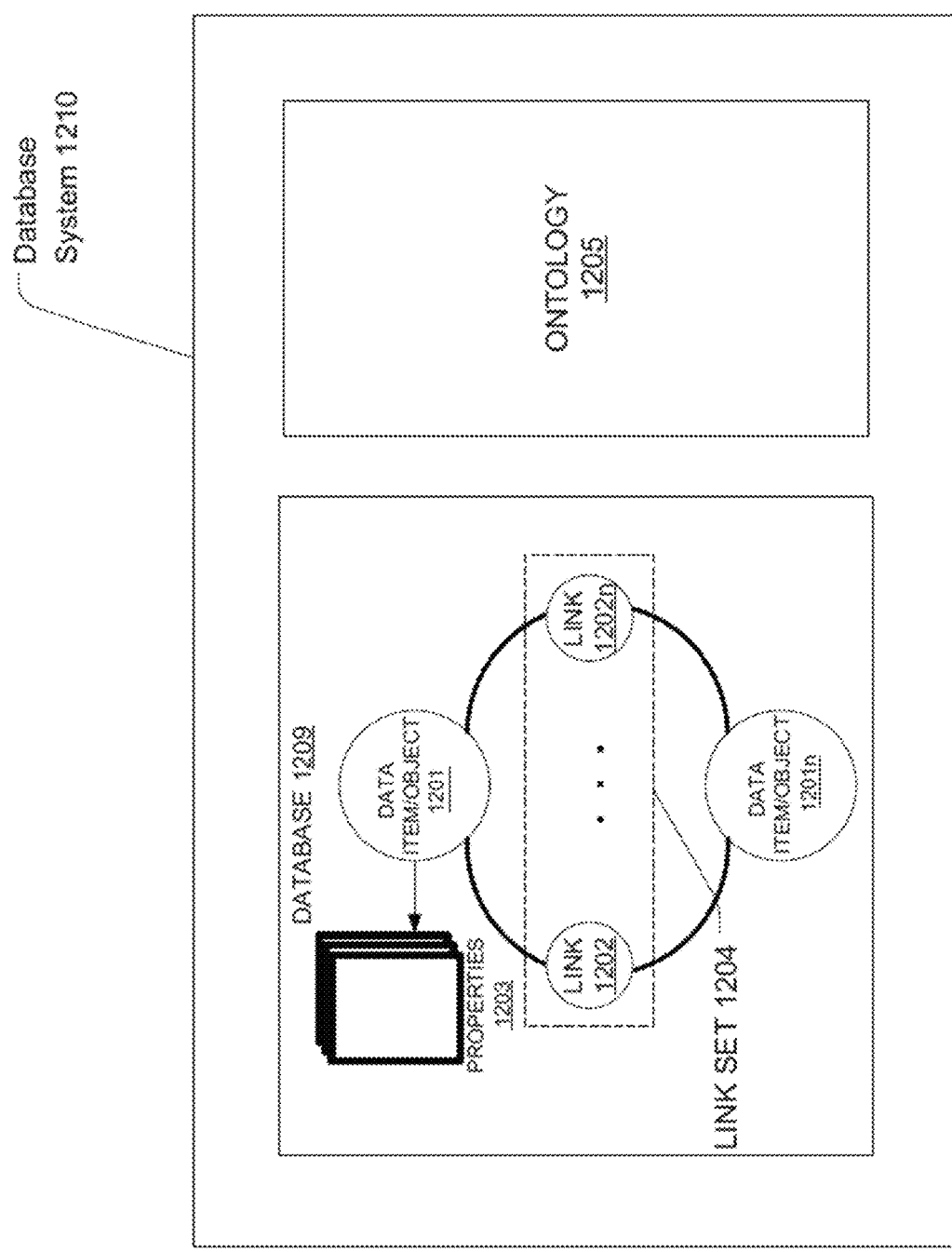
FIG. 6A illustrates an embodiment of a database system using an ontology.

FIG. 6A illustrates data item-centric conceptual data model (which may also be referred to as an "object-centric conceptual data model") according to an embodiment. An ontology 1205, as noted above, may include stored information providing a data model for storage of data in the database 1209. The ontology 1205 may be defined by one or more data item types (which may also be referred to as "object types"), which may each be associated with one or more property types. At the highest level of abstraction, data item 1201 (which may also be referred to as a "data object" or "object") is a container for information representing things in the world. For example, data item 1201 can represent an entity such as a person, a place, an organization, a market instrument, or other noun. Data item 1201 can represent an event that happens at a point in time or for a duration. Data item 1201 can represent a document or other unstructured data source such as a file (for example, a malware file), an email message, a news report, or a written paper or article. Each data item 1201 is associated with a unique identifier that uniquely identifies the data item within the database system.

Different types of data items may have different property types. For example, a "file" data item (as described above) may have various property types as described above (for example, various hash property types, associated file property types, various external analysis property types, and/or the like), a "Person" data item may have an "Eye Color" property type, and an "Event" data item may have a "Date" property type. Each property 1203 as represented by data in the database system 1210 may have a property type defined by the ontology 1205 used by the database 1205. Properties of data items may, in an embodiment, themselves be data items and/or associated with data items. For example, file data items may be associated with various analysis information items, as described above. Analysis information items may comprise data items and/or properties associated with data items (for example, file data items).

Items may be instantiated in the database 1209 in accordance with the corresponding data item definition for the particular data item in the ontology 1205. For example, a specific monetary payment (e.g., an item of type "event") of US$30.00 (e.g., a property of type "currency") taking place on Mar. 27, 2009 (e.g., a property of type "date") may be stored in the database 1209 as an event data item with associated currency and date properties as defined within the ontology 1205.

The data objects defined in the ontology 1205 may support property multiplicity. In particular, a data item 1201 may be allowed to have more than one property 1203 of the same property type. For example, a "Person" data item may have multiple "Address" properties or multiple "Name" properties.

Each link 1202 represents a connection between two data items 1201. In one embodiment, the connection is either through a relationship, an event, or through matching properties. A relationship connection may be asymmetrical or symmetrical. For example, "Person" data item A may be connected to "Person" data item B by a "Child Of" relationship (where "Person" data item B has an asymmetric "Parent Of" relationship to "Person" data item A), a "Kin Of" symmetric relationship to "Person" data item C, and an asymmetric "Member Of" relationship to "Organization" data item X. The type of relationship between two data items may vary depending on the types of the data items. For example, "Person" data item A may have an "Appears In" relationship with "Document" data item Y or have a "Participate In" relationship with "Event" data item E. As an example of an event connection, two "Person" data items may be connected by an "Airline Flight" data item representing a particular airline flight if they traveled together on that flight, or by a "Meeting" data item representing a particular meeting if they both attended that meeting. In one embodiment, when two data items are connected by an event, they are also connected by relationships, in which each data item has a specific relationship to the event, such as, for example, an "Appears In" relationship.

As an example of a matching properties connection, two "Person" data items representing a brother and a sister, may both have an "Address" property that indicates where they live. If the brother and the sister live in the same home, then their "Address" properties likely contain similar, if not identical property values. In one embodiment, a link between two data items may be established based on similar or matching properties (e.g., property types and/or property values) of the data items. These are just some examples of the types of connections that may be represented by a link and other types of connections may be represented; embodiments are not limited to any particular types of connections between data items. For example, a document might contain references to two different items. For example, a document may contain a reference to a payment (one item), and a person (a second item). A link between these two items may represent a connection between these two entities through their co-occurrence within the same document.

Each data item 1201 may have multiple links with another data item 1201 to form a link set 1204. For example, two "Person" data items representing a husband and a wife could be linked through a "Spouse Of" relationship, a matching "Address" property, and one or more matching "Event" properties (e.g., a wedding). Each link 1202 as represented by data in a database may have a link type defined by the database ontology used by the database.

Figure 6B:
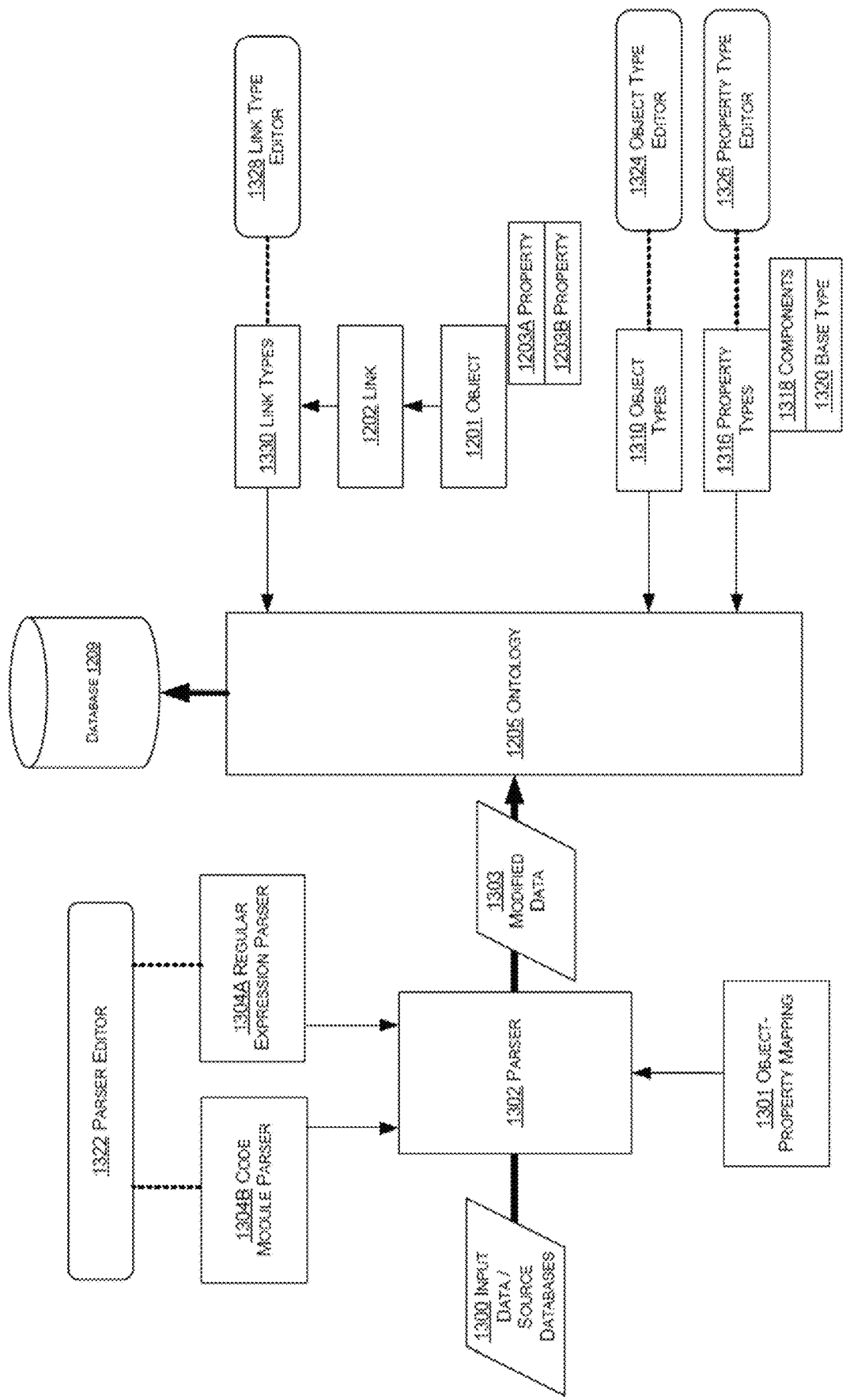
FIG. 6B illustrates an embodiment of a system for creating data in a data store using a dynamic ontology.

FIG. 6B is a block diagram illustrating example components and data that may be used in identifying and storing data according to an ontology. In this example, the ontology may be configured, and data in the data model populated, by a system of parsers and ontology configuration tools. In the embodiment of FIG. 6B, input data 1300 is provided to parser 1302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 1302 is able to read a variety of source input data types and determine which type of data it is reading.

In accordance with the discussion above, the example ontology 1205 comprises stored information providing the data model of data stored in database 1209, and the ontology is defined by one or more data item types 1310, one or more property types 1316, and one or more link types 1330. Based on information determined by the parser 1302 or other mapping of source input information to item type, one or more data items 1201 may be instantiated in the database 209 based on respective determined item types 1310, and each of the items 1201 has one or more properties 1203 that are instantiated based on property types 1316. Two data items 1201 may be connected by one or more links 1202 that may be instantiated based on link types 1330. The property types 1316 each may comprise one or more data types 1318, such as a string, number, etc. Property types 1316 may be instantiated based on a base property type 1320. For example, a base property type 1320 may be "Locations" and a property type 1316 may be "Home."

In an embodiment, a user of the system uses an item type editor 1324 to create and/or modify the item types 1310 and define attributes of the item types. In an embodiment, a user of the system uses a property type editor 1326 to create and/or modify the property types 1316 and define attributes of the property types. In an embodiment, a user of the system uses link type editor 1328 to create the link types 1330. Alternatively, other programs, processes, or programmatic controls may be used to create link types and property types and define attributes, and using editors is not required.

In an embodiment, creating a property type 1316 using the property type editor 1326 involves defining at least one parser definition using a parser editor 1322. A parser definition comprises metadata that informs parser 1302 how to parse input data 1300 to determine whether values in the input data can be assigned to the property type 1316 that is associated with the parser definition. In an embodiment, each parser definition may comprise a regular expression parser 1304A or a code module parser 1304B. In other embodiments, other kinds of parser definitions may be provided using scripts or other programmatic elements. Once defined, both a regular expression parser 1304A and a code module parser 1304B can provide input to parser 1302 to control parsing of input data 1300.

Using the data types defined in the ontology, input data 1300 may be parsed by the parser 1302 determine which item type 1310 should receive data from a record created from the input data, and which property types 1316 should be assigned to data from individual field values in the input data. Based on the item/object-property mapping 1301, the parser 1302 selects one of the parser definitions that is associated with a property type in the input data. The parser parses an input data field using the selected parser definition, resulting in creating new or modified data 1303. The new or modified data 1303 is added to the database 1209 according to ontology 205 by storing values of the new or modified data in a property of the specified property type. As a result, input data 1300 having varying format or syntax can be created in database 1209. The ontology 1205 may be modified at any time using item/object type editor 1324, property type editor 1326, and link type editor 1328, or under program control without human use of an editor. Parser editor 1322 enables creating multiple parser definitions that can successfully parse input data 1300 having varying format or syntax and determine which property types should be used to transform input data 300 into new or modified input data 1303.

The properties, data items, and links (e.g. relationships) between the data items can be visualized using a graphical user interface ("GUI"). For example, FIG. 6C displays a user interface showing a graph representation 1403 of relationships (including relationships and/or links 1404, 1405, 1406, 1407, 1408, 1409, 1410, 1411, 1412, and 1413) between the data items (including data items 1421, 1422, 1423, 1424, 1425, 1426, 1427, 1428, and 1429) that are represented as nodes in the example of FIG. 6C. In this embodiment, the data items include person data items 1421, 1422, 1423, 1424, 1425, and 1426; a flight item 1427; a financial account 1428; and a computer data item 1429. In this example, each person node (associated with person data items), flight node (associated with flight data items), financial account node (associated with financial account data items), and computer node (associated with computer data items) may have relationships and/or links with any of the other nodes through, for example, other data items such as payment data items.

Figure 6C:
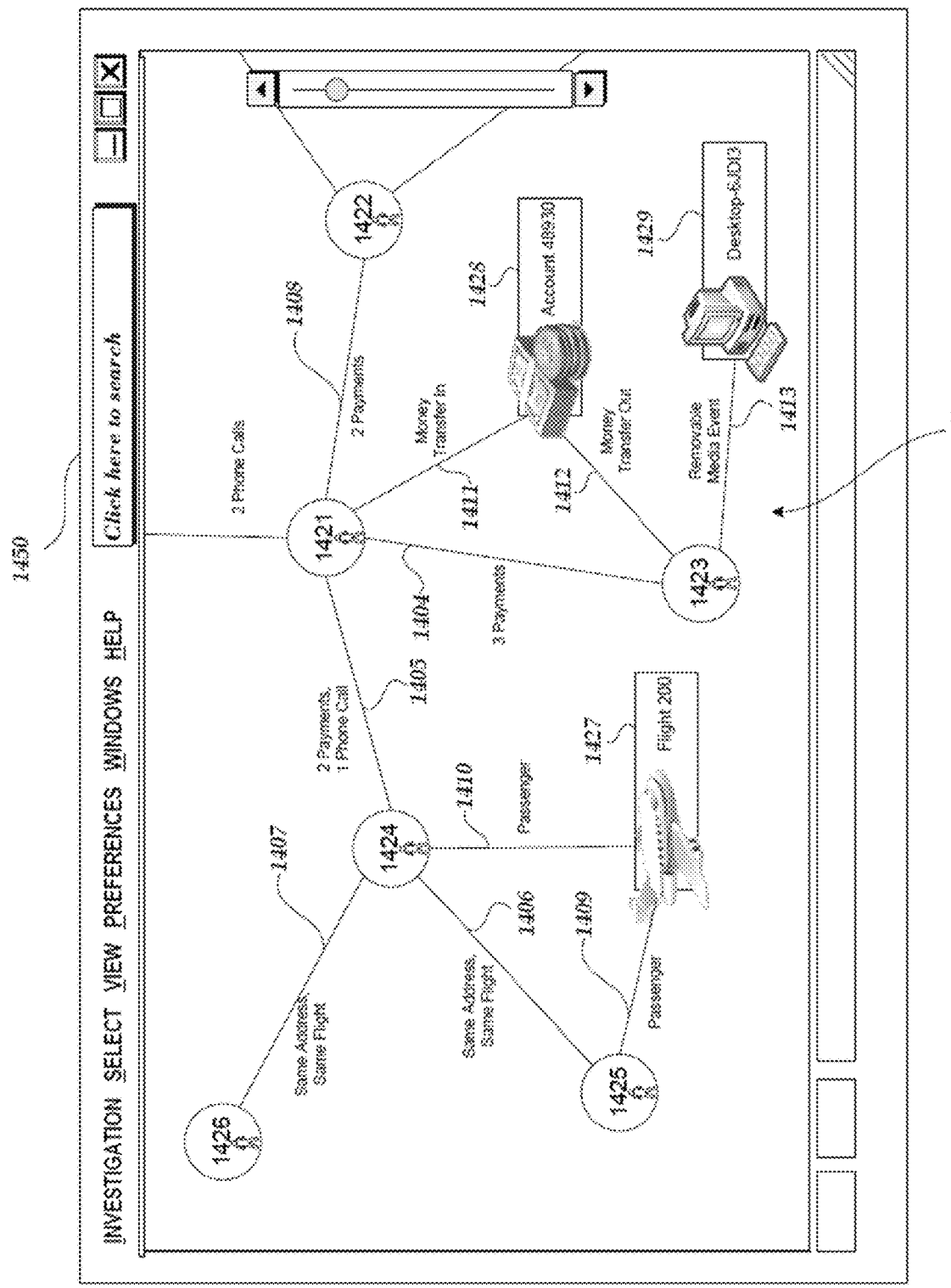
FIG. 6C illustrates a sample user interface using relationships described in a data store using a dynamic ontology.

For example, in FIG. 6C, relationship 1404 is based on a payment associated with the individuals indicated in person data items 1421 and 1423. The link 1404 represents these shared payments (for example, the individual associated with data item 1421 may have paid the individual associated with data item 1423 on three occasions). The relationship is further indicated by the common relationship between person data items 1421 and 1423 and financial account data item 1428. For example, link 1411 indicates that person data item 1421 transferred money into financial account data item 1428, while person data item 1423 transferred money out of financial account data item 1428. In another example, the relationships between person data items 1424 and 1425 and flight data item 1427 are indicated by links 1406, 1409, and 1410. In this example, person data items 1424 and 1425 have a common address and were passengers on the same flight data item 1427. In an embodiment, further details related to the relationships between the various items may be displayed. For example, links 1411 and 1412 may, in some embodiments, indicate the timing of the respective money transfers. In another example, the time of the flight associated with the flight data item 1427 may be shown.

Relationships between data items may be stored as links, or in some embodiments, as properties, where a relationship may be detected between the properties. In some cases, as stated above, the links may be directional. For example, a payment link may have a direction associated with the payment, where one person data item is a receiver of a payment, and another person data item is the payer of payment.

In various embodiments, data items may further include malware analysis metadata and/or links. Such malware analysis metadata may be accessed by the data analysis system for displaying objects and features on the user interface (as described above).

In addition to visually showing relationships between the data items, the user interface may allow various other manipulations. For example, the data items within database 1108 may be searched using a search interface 1450 (e.g., text string matching of data item properties), inspected (e.g., properties and associated data viewed), filtered (e.g., narrowing the universe of data items into sets and subsets by properties or relationships), and statistically aggregated (e.g., numerically summarized based on summarization criteria), among other operations and visualizations.

Implementation Mechanisms

According to an embodiment, the data analysis system and other methods and techniques described herein are implemented by one or more special-purpose computing devices. For example, the server computing system 110 and/or client computer system 130, as illustrated in FIG. 1, may be implemented as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
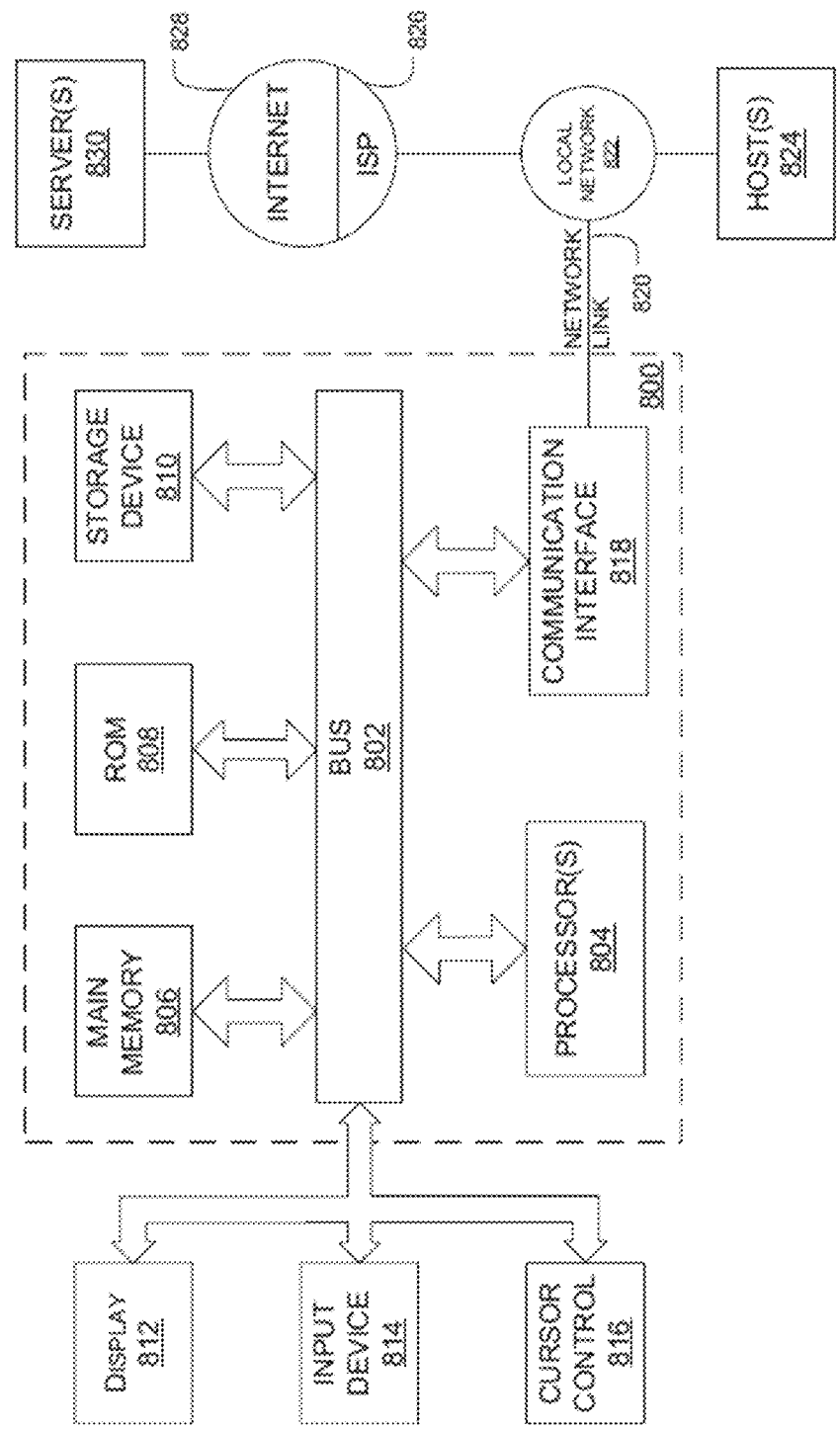
FIG. 7 illustrates a computer system with which certain methods discussed herein may be implemented.

For example, FIG. 7 is a block diagram that illustrates a computer system 800 upon which the various systems and methods discussed herein may be implemented. For example, in various embodiments, any of the computing systems illustrated in FIG. 1, such client computer system 130 and/or server computing system 110, may be implemented as computer systems 800 and/or servers 830 as illustrated in FIG. 7.

Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), and/or any other suitable data store, is provided and coupled to bus 802 for storing information (for example, file data items, analysis information data items, submission data items, and/or the like) and instructions.

Computer system 800 may be coupled via bus 802 to a display 812, such as a cathode ray tube (CRT), LCD display, or touch screen display, for displaying information to a computer user and/or receiving input from the user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module (e.g., a user interface engine 126 as illustrated in FIG. 1), and/or various other types of modules to implement one or more graphical user interface of the data analysis system, as described above. The modules may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware devices (such as processors and CPUs) may be comprised of connected logic units, such as gates and flip-flops, and/or may be comprised of programmable units, such as programmable gate arrays or processors. Generally, the modules described herein refer to logical modules that may be combined with other modules or divided into sub-modules despite their physical organization or storage. In various embodiments, aspects of the methods and systems described herein may be implemented by one or more hardware devices, for example, as logic circuits. In various embodiments, some aspects of the methods and systems described herein may be implemented as software instructions, while other may be implemented in hardware, in any combination.

As mentioned, computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more modules and/or instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions and/or modules into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media. In some embodiments, network 150 (as illustrated in FIG. 1) may correspond to a local network 822 and/or Internet 828.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. For example, in an embodiment various aspects of the data analysis system may be implemented on one or more of the servers 830 and may be transmitted to and from the computer system 800. For example, submitted malware data items may be transmitted to one of the servers 830, aspects of the basic analysis may be implemented on one or more of the servers 830, and/or aspects of the external analysis may be implemented on one or more of the servers 830. In an example, requests for external analyses of file data items may be transmitted to one or more third-party servers 830 (from, for example, the computer system 800 and/or another server 830 of the system), and analysis data may then be transmitted back from third-party servers 830.

In an embodiment, the data analysis system may be accessible by the user through a web-based viewer, such as a web browser. In this embodiment, the user interfaces of the system may be generated by a server (such as one of the servers 830) and/or the computer system 800 and transmitted to the web browser of the user. The user may then interact with the user interfaces through the web-browser. In an embodiment, the computer system 800 may comprise a mobile electronic device, such as a cell phone, smartphone, and/or tablet. The system may be accessible by the user through such a mobile electronic device, among other types of electronic devices.

Additional Embodiments

While the foregoing is directed to various embodiments, other and further embodiments may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being redefined herein to be restricted to including any specific characteristics of the features or aspects of the invention with which that terminology is associated. The scope of the invention should therefore be construed in accordance with the appended claims and any equivalents thereof.

What is claimed is:

1. A computer system configured generate an interactive graphical user interface for accessing, enriching, and analyzing a plurality of raw data items, the computer system comprising:

one or more computer readable storage devices configured to store:
a plurality of computer executable instructions; and
a plurality of raw data items, wherein a raw data item is associated with one or more attributes, wherein the one or more attributes comprise at least one time-based attribute; and one or more hardware computer processors in communication with the one or more computer readable storage devices and configured to execute the plurality of computer executable instructions in order to cause the computer system to:
identify a data item lead from the plurality of raw data items;
receive one or more search parameters based at least in part upon an attribute associated with the data item lead;
query the plurality of raw data items based at least in part upon the received search parameters to receive a first group of raw data items; and
generate an interactive graphical user interface to display the first group of raw data items, wherein the interactive graphical user interface comprises:
a plurality of tabs that are each associated with respective subsets of the first group of raw data items, wherein one of the plurality of tabs comprises a currently displayed tab;
a table that includes, in a tabular format, at least a portion of the first group of raw data items associated with the currently displayed tab;
a histogram of at least a portion of the first group of raw data items, wherein raw data items included in the histogram are grouped based at least in part upon shared attribute values of the raw data items, and wherein the raw data items included in the histogram are associated with the currently displayed tab; and
a timeline of at least a portion the first group of raw data items, wherein raw data items included in the timeline are grouped based at least in part upon a time-based attribute of the raw data items, and wherein the raw data items included in the timeline are associated with at least two of the plurality of tabs;

receive, via the interactive graphical user interface, a user selection of at least one shared attribute value associated with the histogram or at least one time-based attribute value associated with the timeline, wherein the user selection indicates a selection of one or more graphical elements representing one or more raw data items displayed in the histogram or timeline; and in response to the receiving the user selection, update the table, histogram, and timeline such that the table, histogram, and timeline include only raw data items of the first group of raw data items corresponding with the selected at least one shared attribute value or the selected at least one time-based attribute value.

2. The computer system of claim 1, wherein a raw data item corresponds to an occurrence of a proxy request on a monitored network.

3. The computer system of claim 1, wherein a raw data item corresponds to an occurrence of a process on a device on a monitored network.

4. The computer system of claim 1, wherein identifying a data item lead comprises:

receiving the plurality of raw data items from one or more data sources;

performing initial analysis or filtering on the plurality of raw data items;

performing at least one enrichment on the plurality of raw data items;

calculating scores for the plurality raw data items; and identifying a raw data item of the plurality of raw data items having a score satisfying a threshold as a data item lead.

5. The computer system of claim 4, wherein performing initial analysis or filtering on the plurality of raw data items comprises running the plurality of raw data items against a whitelist.

6. The computer system of claim 4, wherein performing at least one enrichment on the plurality of data items comprises performing an external analysis on the plurality of raw data items using one or more third party analysis systems.

7. The computer system of claim 4, wherein performing at least one enrichment on the plurality of data items comprises determining a frequency or distribution of an event associated with a raw data item of the plurality of raw data items.

8. The computer system of claim 1, wherein the plurality of computer executable instructions are configured to further cause the computer system to perform an aggregation of raw data items of the first group of raw data items based at least in part upon an attribute value.

9. The computer system of claim 1, wherein the first group of raw data items comprises raw data items of two or more data types.

10. The computer system of claim 9, wherein the raw data items are separated into two or more tabs of the plurality of tabs based upon a type of the raw data items.

11. The computer system of claim 1, wherein the selected attribute is associated with one or more attribute value groups, and wherein the histogram groups data items of the first group of raw data items using the one or more attribute value groups.

12. The computer system of claim 1, wherein the selected attribute is selected from the one or more attributes based at least in part upon a selection by a human analyst.

13. The computer system of claim 1, wherein the time-based attribute of the at least one time-based attribute is selected based at least in part upon a selection by a human analyst.

14. The computer system of claim 1, wherein the raw data items included in the timeline includes the raw data items that are associated with a currently displayed tab.

15. The computer system of claim 1, wherein the raw data items displayed by the timeline comprises raw data items associated with all tabs of the two or more tabs.

16. A computer-implemented method of generating an interactive graphical user interface for accessing, enriching, and analyzing a plurality of raw data items, the computer-implemented method comprising:

by one or more hardware computer processors configured to execute computer executable instructions:

identifying a data item lead from a plurality of raw data items, wherein a raw data item is associated with one or more attributes, wherein the one or more attributes comprise at least one time-based attribute;

receiving one or more search parameters based at least in part upon an attribute associated with the data item lead;

querying the plurality of raw data items based at least in part upon the received search parameters to receive a first group of raw data items; and generating an interactive graphical user interface to display the first group of raw data items, wherein the interactive graphical user interface comprises:

a plurality of tabs that are each associated with respective subsets of the first group of raw data items, wherein one of the plurality of tabs comprises a currently displayed tab;

a table that includes, in a tabular format, at least a portion of the first group of raw data items associated with the currently displayed tab;

a histogram of at least a portion of the first group of raw data items, wherein raw data items included in the histogram are grouped based at least in part upon shared attribute values of the raw data items, and wherein the raw data items included in the histogram are associated with the currently displayed tab; and a timeline of at least a portion the first group of raw data items, wherein raw data items included in the timeline are grouped based at least in part upon a time-based attribute of the raw data items, and wherein the raw data items included in the timeline are associated with at least two of the plurality of tabs;

receiving, via the interactive graphical user interface, a user selection of at least one shared attribute value associated with the histogram or at least one time-based attribute value associated with the timeline, wherein the user selection indicates a selection of one or more graphical elements representing one or more raw data items displayed in the histogram or timeline; and in response to the receiving the user selection, updating the table, histogram, and timeline such that the table, histogram, and timeline include only raw data items of the first group of raw data items corresponding with the selected at least one shared attribute value or the selected at least one time-based attribute value.

17. The computer-implemented method of claim 16, wherein the raw data items included in the timeline are associated with all tabs of the plurality of tabs.

18. The computer-implemented method of claim 16 wherein the raw data items included in the timeline includes the raw data items that are associated with a currently displayed tab.

19. A non-transitory computer-readable storage medium including computer executable instructions that, when executed by a processor, cause the processor to:
 identify a data item lead from a plurality of raw data items, wherein a raw data item is associated with one or more attributes, wherein the one or more attributes comprise at least one time-based attribute;
 receive one or more search parameters based at least in part upon an attribute associated with the data item lead;
 query the plurality of raw data items based at least in part upon the received search parameters to receive a first group of raw data items; and
 generate an interactive graphical user interface to display the first group of raw data items, wherein the interactive graphical user interface comprises:
  a plurality of tabs that are each associated with respective subsets of the first group of raw data items, wherein one of the plurality of tabs comprises a currently displayed tab;
  a table that includes, in a tabular format, at least a portion of the first group of raw data items associated with the currently displayed tab;
  a histogram of at least a portion of the first group of raw data items, wherein raw data items included in the histogram are grouped based at least in part upon shared attribute values of the raw data items, and wherein the raw data items included in the histogram are associated with the currently displayed tab; and
  a timeline of at least a portion the first group of raw data items, wherein raw data items included in the timeline are grouped based at least in part upon a time-based attribute of the raw data items, and wherein the raw data items included in the timeline are associated with at least two of the plurality of tabs;
 receive, via the interactive graphical user interface, a user selection of at least one shared attribute value associated with the histogram or at least one time-based attribute value associated with the timeline, wherein the user selection indicates a selection of one or more graphical elements representing one or more raw data items displayed in the histogram or timeline; and
 in response to the receiving the user selection, update the table, histogram, and timeline such that the table, histogram, and timeline include only raw data items of the first group of raw data items corresponding with the selected at least one shared attribute value or the selected at least one time-based attribute value.

20. The non-transitory computer-readable storage medium of claim 19, wherein the raw data items included in the timeline are associated with all tabs of the plurality of tabs.

* * * * *